United States Patent
Satomi et al.

(10) Patent No.: US 7,584,203 B2
(45) Date of Patent: Sep. 1, 2009

(54) INFORMATION PROCESSING SYSTEM, INFORMATION PROCESSING APPARATUS, ARCHIVE INFORMATION MANAGEMENT METHOD, STORAGE MEDIUM WHICH STORES INFORMATION-PROCESSING-APPARATUS-READABLE PROGRAM THAT IMPLEMENTS THE METHOD, AND PROGRAM

(75) Inventors: Hiroshi Satomi, Kanagawa (JP); Satoshi Igeta, Kanagwa (JP); Tomonobu Hiraishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 501 days.

(21) Appl. No.: 10/434,158

(22) Filed: May 9, 2003

(65) Prior Publication Data

US 2003/0217240 A1 Nov. 20, 2003

(30) Foreign Application Priority Data

May 14, 2002 (JP) ............................. 2002-139064
Sep. 13, 2002 (JP) ............................. 2002-268826

(51) Int. Cl.
G06F 17/30 (2006.01)
(52) U.S. Cl. .................................... 707/102; 707/104.1
(58) Field of Classification Search ................ 707/104, 707/100, 102, 104.1; 705/26; 348/207.1; 463/20; 711/161
See application file for complete search history.

(56) References Cited

U.S. PATENT DOCUMENTS 6,332,146 B1 * 12/2001 Jebens et al. ............. 707/104.1
6,411,943 B1 * 6/2002 Crawford ................... 705/400
6,801,576 B1 * 10/2004 Haldeman et al. ....... 375/240.29
2001/0044859 A1 * 11/2001 Koch et al. ...................... 710/5
2002/0013742 A1 * 1/2002 Shiota et al. ................. 705/26
2002/0063889 A1 * 5/2002 Takemoto et al. .......... 358/1.15
2003/0123632 A1 * 7/2003 Smith ..................... 379/220.01
2003/0154233 A1 * 8/2003 Patterson .................... 709/104
2004/0201683 A1 * 10/2004 Murashita et al. ......... 348/207.1
2006/0030396 A1 * 2/2006 Marks et al. ................. 463/20

FOREIGN PATENT DOCUMENTS

JP 2-98779 4/1990
JP 9-6657 1/1997
JP 11-203360 7/1999
JP 2000-250802 9/2000

OTHER PUBLICATIONS

Salzberg, Betty et al., "Comparison of Access Methods for Time-Evolving Data", ACM Computing Survey, vol. 31, No. 2, Jun. 1999, p. 158-221 [online]. Retrieved from the Internet: URL:http://portal.acm.org/ft_gateway.cfm?id=319816&type=pdf&coll=ACM&dl=34743194&CFTOKEN=80800387>.*

(Continued)

Primary Examiner—John E Breene
Assistant Examiner—Dennis Myint
(74) Attorney, Agent, or Firm—Fitzpatrick, Cella, Harper & Scinto

(57) ABSTRACT

This invention allows to control archive of data without any load on the operator of a service by automatically changing the archive condition in correspondence with product information related to the service. When data is to be archived in an apparatus connected to a network, the data archive period is changed on the basis of the information of a product related to the service, which is sent from the user. For example, when the archive condition is the archive period, control is executed to delete data that has expired.

6 Claims, 36 Drawing Sheets

OTHER PUBLICATIONS

Muth, Peter, et al., "The LHAM log-structured History Data Access Method", The International Journal on Very Large Data Bases, vol. 8, Issue 3-4, Feb. 2000, p. 199-221 [online]. Retrieved from the Internet:<URL: http://portal.acm.org/ft_gateway.cfm?id= 764216 &type=pdf&coll=ACM&dl=ACM&CFID=34743194 &CFTOKEN=80800387>.*

U.S. Appl. No. 09/547,317, filed Apr. 11, 2000.

U.S. Appl. No. 10/378,633, filed Mar. 5, 2003.

"Internet Jissen Koza (Learn the Internet the Practical Way)." Yomiuri PC, Japan, Yomiuri Shimbunsha, May 1, 2002, vol. 7, No. 7, pp. 41-45 (w/partial English-language translation).

Japanese Office Action dated Dec. 14, 2007 in corresponding Japanese Application No. 2002-139064.

K. Ohta, "Online Storage Service", Nikkei NetBusiness, Japan, Nikkei Business Publications, Inc., Jul. 10, 2001, No. 78, pp. 86-89.

K. Fujimoto, "Digi-Cam Bisharaku / Picture It! Digi-Cam Studio ver. 2002,—Softwares for managing and retouching large numbers of digital images-", ASHAI pasocom, Japan, Asahi Shimbun Company., Feb. 1, 2002, No. 304, pp. 94-95.

"Internet techniques using a constant Internet connection", PC Japan, Japan, Softbank Publishing Corp. Dec. 1, 2001, vol. 6, No. 12, pp. 96-103.

Japanese Final Rejection dated Apr. 11, 2008 in corresponding Japanese Application No. 2002-139064.

* cited by examiner

FIG. 3

IMAGE INFORMATION TABLE 300

| ITEM | TYPE | |
|---|---|---|
| IMAGE ID | INTEGER TYPE | ~301 |
| USER ID | INTEGER TYPE | ~302 |
| IMAGE NAME | CHARACTER TYPE 64 BYTES | ~303 |
| ORIGINAL IMAGE FILE PATH | CHARACTER TYPE 256 BYTES | ~304 |
| THUMBNAIL IMAGE FILE PATH | CHARACTER TYPE 256 BYTES | ~305 |
| DISPLAY IMAGE FILE PATH | CHARACTER TYPE 256 BYTES | ~306 |
| COMMENT (FILE PATH) | CHARACTER TYPE 256 BYTES | ~307 |
| NUMBER OF TIMES OF BROWSING | INTEGER TYPE | ~308 |
| NUMBER OF TIMES OF PRINTING | INTEGER TYPE | ~309 |
| CREATION DATE / TIME | INTEGER TYPE | ~310 |
| MAIL NOTIFICATION DATE / TIME | INTEGER TYPE | ~311 |
| EDITING DATE / TIME | INTEGER TYPE | ~312 |
| PRINT ORDER DATE / TIME | INTEGER TYPE | ~313 |
| BROWSING DATE / TIME | INTEGER TYPE | ~314 |

FIG. 4

USER INFORMATION TABLE  400

| ITEM | TYPE | |
|---|---|---|
| USER ID | INTEGER TYPE | ~401 |
| FAMILY NAME | CHARACTER TYPE 32 BYTES | ~402 |
| FIRST NAME | CHARACTER TYPE 32 BYTES | ~403 |
| FAMILY NAME (PHONETIC TRANSCRIPTION) | CHARACTER TYPE 32 BYTES | ~404 |
| FIRST NAME (PHONETIC TRANSCRIPTION) | CHARACTER TYPE 32 BYTES | ~405 |
| LOGIN NAME | CHARACTER TYPE 32 BYTES | ~406 |
| PASSWORD | CHARACTER TYPE 32 BYTES | ~407 |
| MAIL ADDRESS | CHARACTER TYPE 256 BYTES | ~408 |
| ZIP CODE | CHARACTER TYPE 256 BYTES | ~409 |
| PREFECTURE | INTEGER TYPE | ~410 |
| ADDRESS 1 | CHARACTER TYPE 256 BYTES | ~411 |
| ADDRESS 2 | CHARACTER TYPE 256 BYTES | ~412 |
| TELEPHONE NUMBER | CHARACTER TYPE 32 BYTES | ~413 |
| DATA ARCHIVE PERIOD | INTEGER TYPE | ~414 |
| DATA ARCHIVE UPPER LIMIT SIZE | INTEGER TYPE | ~415 |

FIG. 5

ARCHIVE TIME LIMIT TABLE 500

| ITEM | TYPE | |
|---|---|---|
| ARCHIVE PERIOD STARTING POINT TYPE | INTEGER TYPE | ~501 |
| INITIAL VALUE OF DATA ARCHIVE UPPER LIMIT | INTEGER TYPE | ~502 |
| INITIAL VALUE OF DATA ARCHIVE PERIOD | INTEGER TYPE | ~503 |

FIG. 6

PRODUCT INFORMATION TABLE 600

| ITEM | TYPE | |
|---|---|---|
| PRODUCT ID | INTEGER TYPE | ~601 |
| PRODUCT NAME | CHARACTER TYPE 256 BYTES | ~602 |
| ADDITIONAL DISK SIZE | INTEGER TYPE | ~603 |
| ADDITIONAL ARCHIVE PERIOD | INTEGER TYPE | ~604 |

FIG. 7

USER PRODUCT TABLE           700

| ITEM | TYPE | |
|---|---|---|
| USER ID | INTEGER TYPE | ~701 |
| PRODUCT ID | INTEGER TYPE | ~702 |
| PRODUCT PURCHASE DATE | INTEGER TYPE | ~703 |
| REGISTRATION DATE | INTEGER TYPE | ~704 |

FIG. 9

USER INFORMATION SETTING WINDOW

E-MAIL ADDRESS: ⎯901
LOGIN NAME: ⎯902
PASSWORD: ⎯903

NAME
FAMILY NAME: ⎯904
FIRST NAME: ⎯905
PHONETIC TRANSCRIPTION FAMILY NAME: ⎯906
FIRST NAME: ⎯907

ADDRESS
〒: ⎯908 – ⎯909   PREFECTURE: ⎯910
NAME OF MUNICIPALITY, NAME OF STREET, AND HOUSE NUMBER ⎯911
NAME OF APARTMENT AND ROOM NUMBER ⎯912

TELEPHONE NUMBER
913 – 914 – 915

SET PURCHASED PRODUCT INFORMATION ⎯916

REGISTER 917   CANCEL 918

FIG. 10

| | PRODUCT NAME | SERIAL NUMBER | DATE OF PURCHASE |
|---|---|---|---|
| ☐ | PRODUCT A | ACB12345678 | FEBRUARY 3, 1999 |
| ☐ | PRODUCT B | DEF90123456 | OCTOBER 28, 2000 |
| ☐ | PRODUCT C | GHI78901234 | JUNE 10, 2001 |
| | | | |

PRODUCT NAME: PRODUCT A  SERIAL NUMBER:

DATE OF PURCHASE: YEAR  MONTH  DAY

ADD PRODUCT

DELETE CHECK-MARKED PRODUCT

OK   CANCEL

FIG. 13

```
Date : Sat. 23 Jun 2001 02:34:55+0900
From : PhotoSite (△△△@canon.co.jp)
To : aaa@○○.ne.jp
Subject : PUBLIC ALBUM NOTIFICATION
Error-to : △△△@canon.co.jp
Content-Type : text/plain ; charset = "ISO-2022-JP"
Content-Transfer-Encoding : 7bit YOU CAN BROWSE PUBLIC ALBUMS OF PHOTO SITE AT FOLLOWING URL
http://www.○○○.com/PhotoSite/UserAlbum/AlbumEntry.cgi?AlbumID = AJNWDMF
YOU CAN ALSO BROWSE ALBUMS AT FOLLOWING URL BY DESIGNATING
FOLLOWING ALBUM ID
http://www.○○○.com/PhotoSite/
ALBUM ID : AJNWDMF — MESSAGE FROM SENDER —
THANK YOU FOR YOUR CONTINUED PATRONAGE.
WE HAVE UPLOADED PICTURES IN RECENT FAIR.
PLEASE INFORM US WHEN YOU SEE THEM.
— END OF MESSAGE —
```

1300

F I G. 14
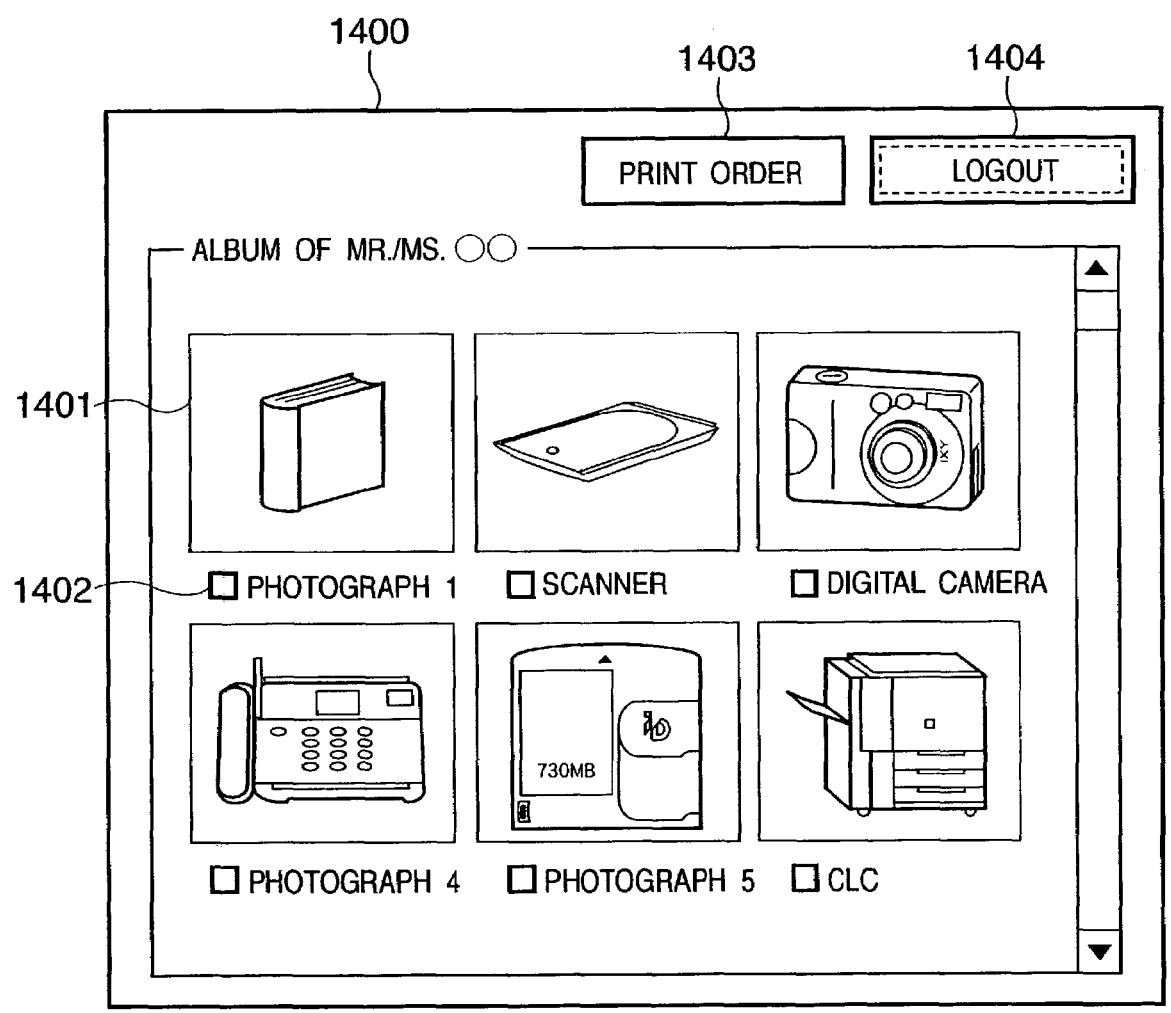

FIG. 17

IMAGE INFORMATION TABLE     300B

| ITEM | TYPE | |
|---|---|---|
| IMAGE ID | INTEGER TYPE | ~301 |
| USER ID | INTEGER TYPE | ~302 |
| IMAGE NAME | CHARACTER TYPE 64 BYTES | ~303 |
| ORIGINAL IMAGE FILE PATH | CHARACTER TYPE 256 BYTES | ~304 |
| THUMBNAIL IMAGE FILE PATH | CHARACTER TYPE 256 BYTES | ~305 |
| DISPLAY IMAGE FILE PATH | CHARACTER TYPE 256 BYTES | ~306 |
| COMMENT (FILE PATH) | CHARACTER TYPE 256 BYTES | ~307 |
| NUMBER OF TIMES OF BROWSING | INTEGER TYPE | ~308 |
| NUMBER OF TIMES OF PRINTING | INTEGER TYPE | ~309 |
| CREATION DATE / TIME | INTEGER TYPE | ~310 |
| MAIL NOTIFICATION DATE / TIME | INTEGER TYPE | ~311 |
| EDITING DATE / TIME | INTEGER TYPE | ~312 |
| PRINT ORDER DATE / TIME | INTEGER TYPE | ~313 |
| BROWSING DATE / TIME | INTEGER TYPE | ~314 |
| DELETE NOTIFICATION FLAG | INTEGER TYPE | ~1701 |

FIG. 18

USER INFORMATION TABLE 400B

| ITEM | TYPE | |
|---|---|---|
| USER ID | INTEGER TYPE | 401 |
| FAMILY NAME | CHARACTER TYPE 32 BYTES | 402 |
| FIRST NAME | CHARACTER TYPE 32 BYTES | 403 |
| FAMILY NAME (PHONETIC TRANSCRIPTION) | CHARACTER TYPE 32 BYTES | 404 |
| FIRST NAME (PHONETIC TRANSCRIPTION) | CHARACTER TYPE 32 BYTES | 405 |
| LOGIN NAME | CHARACTER TYPE 32 BYTES | 406 |
| PASSWORD | CHARACTER TYPE 32 BYTES | 407 |
| MAIL ADDRESS | CHARACTER TYPE 256 BYTES | 408 |
| ZIP CODE | CHARACTER TYPE 256 BYTES | 409 |
| PREFECTURE | INTEGER TYPE | 410 |
| ADDRESS 1 | CHARACTER TYPE 256 BYTES | 411 |
| ADDRESS 2 | CHARACTER TYPE 256 BYTES | 412 |
| TELEPHONE NUMBER | CHARACTER TYPE 32 BYTES | 413 |
| PERIOD UNTIL DELETE NOTIFICATION | INTEGER TYPE | 1801 |
| DATA ARCHIVE PERIOD | INTEGER TYPE | 414 |
| DATA ARCHIVE UPPER LIMIT SIZE | INTEGER TYPE | 415 |
| DELETE ADVANCE NOTICE FLAG | INTEGER TYPE | 1802 |

FIG. 19

ARCHIVE TIME LIMIT TABLE                    500B

| ITEM | TYPE | |
|---|---|---|
| ARCHIVE PERIOD STARTING POINT TYPE | INTEGER TYPE | ~501 |
| INITIAL VALUE OF DATA ARCHIVE UPPER LIMIT | INTEGER TYPE | ~502 |
| INITIAL VALUE OF PERIOD UNTIL NOTIFICATION | INTEGER TYPE | ~1901 |
| INITIAL VALUE OF PERIOD UNTIL DELETE | INTEGER TYPE | ~1902 |

FIG. 23

IMAGE INFORMATION TABLE 300C

| ITEM | TYPE | |
|---|---|---|
| IMAGE ID | INTEGER TYPE | ~301 |
| USER ID | INTEGER TYPE | ~302 |
| IMAGE NAME | CHARACTER TYPE 64 BYTES | ~303 |
| ORIGINAL IMAGE FILE PATH | CHARACTER TYPE 256 BYTES | ~304 |
| THUMBNAIL FILE PATH | CHARACTER TYPE 256 BYTES | ~305 |
| DISPLAY IMAGE FILE PATH | CHARACTER TYPE 256 BYTES | ~306 |
| COMMENT (FILE PATH) | CHARACTER TYPE 256 BYTES | ~307 |
| CREATION DATE / TIME | INTEGER TYPE | ~310 |

FIG. 24

USER INFORMATION TABLE                            400C

| ITEM | TYPE | |
|---|---|---|
| USER ID | INTEGER TYPE | ~401 |
| FAMILY NAME | CHARACTER TYPE 32 BYTES | ~402 |
| FIRST NAME | CHARACTER TYPE 32 BYTES | ~403 |
| FAMILY NAME (PHONETIC TRANSCRIPTION) | CHARACTER TYPE 32 BYTES | ~404 |
| FIRST NAME (PHONETIC TRANSCRIPTION) | CHARACTER TYPE 32 BYTES | ~405 |
| LOGIN NAME | CHARACTER TYPE 32 BYTES | ~406 |
| PASSWORD | CHARACTER TYPE 32 BYTES | ~407 |
| MAIL ADDRESS | CHARACTER TYPE 256 BYTES | ~408 |
| ZIP CODE | CHARACTER TYPE 256 BYTES | ~409 |
| PREFECTURE | INTEGER TYPE | ~410 |
| ADDRESS 1 | CHARACTER TYPE 256 BYTES | ~411 |
| ADDRESS 2 | CHARACTER TYPE 256 BYTES | ~412 |
| TELEPHONE NUMBER | CHARACTER TYPE 32 BYTES | ~413 |
| DATA ARCHIVE UPPER LIMIT SIZE | INTEGER TYPE | ~415 |

FIG. 25

CHARGING INFORMATION TABLE 2500

| ITEM | TYPE | |
|---|---|---|
| ORDER ID | INTEGER TYPE | 2501 |
| USER ID | INTEGER TYPE | 2502 |
| ORDERED IMAGE OWNER ID | INTEGER TYPE | 2503 |
| ORDER DATE / TIME | INTEGER TYPE | 2504 |
| ORDER AMOUNT | INTEGER TYPE | 2505 |
| TAX AMOUNT | INTEGER TYPE | 2506 |
| NUMBER OF COPIES ORDERED | INTEGER TYPE | 2507 |
| PRINT SITE ID | INTEGER TYPE | 2508 |
| PRINT SITE ORDER ID | INTEGER TYPE | 2509 |

FIG. 26

ORDER INFORMATION TABLE 2600

| ITEM | TYPE | |
|---|---|---|
| ORDER ID | INTEGER TYPE | ~2601 |
| IMAGE ID | INTEGER TYPE | ~2602 |
| NUMBER OF IMAGE COPIES ORDERED | INTEGER TYPE | ~2603 |
| ORDER TYPE | INTEGER TYPE | ~2604 |
| ORDER UNIT PRICE | INTEGER TYPE | ~2605 |

FIG. 27

USER INFORMATION SETTING WINDOW — 900B

- E-MAIL ADDRESS: ⎵ — 901
- LOGIN NAME: ⎵ — 902
- PASSWORD: ⎵ — 903

NAME
- FAMILY NAME: ⎵ — 904
- FIRST NAME: ⎵ — 905
- PHONETIC TRANSCRIPTION FAMILY NAME: ⎵ — 906
- FIRST NAME: ⎵ — 907

ADDRESS
- 〒: ⎵ — 908  ⎵ — 909
- PREFECTURE: ⎵ — 910
- NAME OF MUNICIPALITY, NAME OF STREET, AND HOUSE NUMBER ⎵ — 911
- NAME OF APARTMENT AND ROOM NUMBER ⎵ — 912

TELEPHONE NUMBER
- ⎵ — 913  — ⎵ — 914  — ⎵ — 915

CONFIRM USE STATUS — 816

REGISTER — 917    CANCEL — 918

| DATE OF ORDER | ORDER SITE | NUMBER OF COPIES ORDERED | ORDER AMOUNT |
|---|---|---|---|
| APRIL 11, 2002 | PHOTO SITE A | 24 PIECES | 840 YEN |
| MAY 7, 2002 | PHOTO SITE B | 3 PIECES | 1,200 YEN |
| MAY 7, 2002 | PHOTO SITE A | 16 PIECES | 1,260 YEN |
| JUNE 30, 2002 | PHOTO SITE A | 10 PIECES | 350 YEN |
| | | | |

2901

YOUR TOTAL PRINT ORDER AMOUNT OF MONTH BEFORE LAST AND
LAST MONTH IS ¥3,300.
CURRENTLY USABLE DISK CAPACITY IS
BASIC CAPACITY 20 MB+PRINT PRIVILEGE 30 MB=TOTAL OF 50 MB.

2902

YOUR TOTAL PRINT ORDER AMOUNT OF THIS AND
LAST MONTHS IS ¥2,810.
USABLE DISK CAPACITY FOR NEXT MONTH IS
BASIC CAPACITY 20 MB+PRINT PRIVILEGE 20 MB=TOTAL OF 40 MB.

```
<?xml version ="1.0" encode = "Shift_JIS?>
<!DOCTYPE PhotoSiteorder SYSTEM "PhotoSiteorder.dtd">
<xmlns : PhotoSiteorder = "http://www.PHOTO SITE DOMAIN NAME/">

<PhotoSiteorder>
<estimateorder PhotoSiteid = "P0001" PhotoSiteOrderid = "1001" count = "6">
<estimateitem PhotoSiteid = "1">
<name>PHOTOGRAPH 1</name>
<urlimg>
<thumbnail>THUMBNAIL URL</thumbnail>
<image>http://www.PHOTO SITE DOMAIN NAME/printdata/P0001/1.jpg</image>
<preview>http://www.PHOTO SITE DOMAIN NAME/printdata/P0001/1_V.jpg</preview>
</urlimg>
</estimeteitem>
<estimateitem PhotoSiteid = "2">
<name>SCANNER</name>
<urlimg>
<thumbnail>THUMBNAIL URL</thumbnail>
<image>http://www.PHOTO SITE DOMAIN NAME/printdata/P0001/2.jpg</image>
<preview>http://www.PHOTO SITE DOMAIN NAME/printdata/P0001/2_V.jpg</preview>
</urlimg>
</estimeteitem>

···OMISSION (DESCRIPTION FOR IMAGES WHOSE ESTIMATE IS TO BE REQUESTED)

</estimateorder>
</PhotoSiteorder>
```

F I G. 33

```
<?xml version = "1.0" encode = "Shift_JIS"?>
<!DOCTYPE PhotoSiteorder SYSTEM "PhotoSiteorder.dtd">
<xmlns : PhotoSiteorder = "http://www.PHOTO SITE DOMAIN NAME/">

<PhotoSiteorder>
  <estimateresult PhotoSiteid = "P0001" PhotoSiteOrderid = "1001" count = "4">
    <resultmode>success</resultmode>
    <resultinf printsiteid = "Print0001" printsiteOrderid = "Pr-1001">
      <chargeinf total = "1091">
        <print total = "619" charge = "590" tax = "29"/>
        <ship total = "472" charge = "450" tax = "22"/>
      </chargeinf>
    </resultinf>

<printtype edge = "WITH BORDER"/>
    <resultitem PhotoSiteid = "1">
      <printinf size = "L SIZE" count = "1"/>
      <printcharge rate = "40" total = "40"/>
    </resultitem>
    <resultitem PhotoSiteid = "2">
      <printinf size = "L SIZE" count = "3"/>
      <printcharge rate = "40" total = "120"/>
    </resultitem>
    <resultitem PhotoSiteid = "3">
      <printinf size = "A4 SIZE" count = "1"/>
      <printcharge rate = "300" total = "300"/>
    </resultitem>
    <resultitem PhotoSiteid = "6">
      <printinf size = "L SIZE" count = "4"/>
      <printcharge rate = "40" total = "240"/>
    </resultitem>
    <resultitem PhotoSiteid = "NONE">
      <printinf size = "A4 SIZE DISCOUNT" count = "1"/>
      <printcharge rate = "-30" total = "-30"/>
    </resultitem>
  </estimateresult>
</PhotoSiteorder>
```

FIG. 34

```
<?xml version = "1.0" encode = "Shift_JIS"?>
<!DOCTYPE PhotoSiteorder SYSTEM "PhotoSiteorder.dtd">
<xmls : PhotoSiteorder = "http://www.PHOTO SITE DOMAIN NAME/">

<PhotoSiteorder>
  <order printsiteid = "Print0001" printsiteOrderid = "Pr-1001">
              PhotoSiteid = "P0001" PhotoSiteOrderid = "1001" count = "4">
    <orderresult>success</orderresult>
    <orderinf>
      <shipinf>
        <name>CANON TARO</name>
        <zip>AAABBBB</zip>
        <address>TOKYO-TO ○○-KU ○○-CHO1-1-2</address>
        <phone>03XXXXXXXX</phone>
        <email>CANON@canon.co.jp</email>
      </shipinf>
      <chargeinf total = "1091">
        <print total = "619" charge = "590" tax = "29"/>
        <ship total = "472" charge = "450" tax = "22"/>
      </chargeinf>
    </orderinf>
    <ordertitem PhotoSiteid = "1">
      <printinf size = "L SIZE" count = "1"/>
      <printcharge rate = "40" total = "40"/>
    </orderitem>
    <ordertitem PhotoSiteid = "2">
      <printinf size = "L SIZE" count = "3"/>
      <printcharge rate = "40" total = "120"/>
    </orderitem>
    <ordertitem PhotoSiteid = "3">
      <printinf size = "A4 SIZE" count = "1"/>
      <printcharge rate = "300" total = "300"/>
    </orderitem>
    <ordertitem PhotoSiteid = "6">
      <printinf size = "L SIZE" count = "4"/>
      <printcharge rate = "40" total = "240"/>
    </orderitem>
    <ordertitem PhotoSiteid = "NONE">
      <printinf size = "A4 SIZE DISCOUNT" count = "1"/>
      <printcharge rate = "-30" total = "-30"/>
    </orderitem>
  </order>
</PhotoSiteorder>
```

# INFORMATION PROCESSING SYSTEM, INFORMATION PROCESSING APPARATUS, ARCHIVE INFORMATION MANAGEMENT METHOD, STORAGE MEDIUM WHICH STORES INFORMATION-PROCESSING-APPARATUS-READABLE PROGRAM THAT IMPLEMENTS THE METHOD, AND PROGRAM

FIELD OF THE INVENTION

The present invention relates to an information processing system, an information processing apparatus, an archive information management method, a storage medium which stores an information-processing-apparatus-readable program that implements the method, and a program and, more particularly, to an information processing system, an information processing apparatus, an archive information management method, a storage medium which stores an information-processing-apparatus-readable program that implements the method, and a program, which archive user's digital image data on a server connected using a communication environment such as the Internet and make the data open to a third party.

BACKGROUND OF THE INVENTION

There are conventionally sites that provide a service to keep digital image data that a user has acquired using a digital camera or scanner on a storage area of a server on a network and allow the user to browse the image data as needed. There are also service sites that provide a service to archive user's digital image data and make it open to a third party desired by the user. Such providers that provide network services using user's digital image data will be referred to as photo sites hereinafter. Some of these photo sites provide print services of the digital image data.

Along with the establishment of Internet environment, particularly, penetration of high-speed lines into ordinary homes, and popularization of high-image-quality digital cameras, the file sizes of images uploaded to photo sites are abruptly increasing. For this reason, to archive all user images for a long time, the capacity of an image database prepared in a photo site becomes enormous as the service period becomes long. The system operation cost to add disks increases the burden on the service operator. The archived images include a number of already unnecessary images. Actually it is not always necessary to store all images for a predetermined period or more. However, the images cannot be deleted at random, and it is difficult to take any measures. To suppress the operation cost, the system operator of a photo site imposes predetermined restrictions on service users in advance to prevent image files in a predetermined amount or more from being uploaded.

On the other hand, the larger the number of print orders becomes, the larger the file sizes of image data to be uploaded increase. If the system operator inhibits upload of image files in a predetermined amount or more to reduce the operation cost, a user who wants to place a number of print orders must upload images until the file size reaches the upper limit of the allowable image upload amount. After the print orders are placed, the user must temporarily delete the uploaded images and then repeatedly upload new images and place print orders. This makes the photo site inconvenient.

Such a user is an important user who greatly contributes to the profit of the service operator. To promote use of the photo site, a service that provides privileges corresponding to the service use amount is necessary.

SUMMARY OF THE INVENTION

The present invention has been made to solve the above problems of the prior art, and has as its object to provide an information processing system, an information processing apparatus, an archive information management method, a storage medium which stores an information-processing-apparatus-readable program that implements the method, and a program, which allow to automatically change service use conditions without any load on an operator by controlling privileges in correspondence with the purchase information of each service user for product information related to a service.

According to an aspect of the present invention, a method of providing a service for archiving data on a network, comprises steps of changing an archive condition of the data on the basis of information of a product related to the service; and controlling archive of the data in accordance with the changed archive condition.

According to another aspect of the present invention, a program causes a computer to execute a method of providing a service for archiving data on a network, the method comprising steps of changing an archive condition of the data on the basis of information of a product related to the service; and controlling archive of the data in accordance with the changed archive condition.

According to another aspect of the present invention, a storage medium stores a computer-readable program which causes a computer to execute a method of providing a service for archiving data on a network, the method comprising steps of changing an archive condition of the data on the basis of information of a product related to the service; and controlling archive of the data in accordance with the changed archive condition.

According to another aspect of the present invention, an information processing apparatus which provides a service for archiving data on a network, comprises means for changing an archive condition of the data on the basis of information of a product related to the service; and means for controlling archive of the data in accordance with the changed archive condition.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view showing an example of an image information table which stores information related to each image in the embodiment;

FIG. 4 is a view showing an example of a user information table according to the embodiment;

FIG. 5 is a view showing an example of the contents of an archive period data table according to the embodiment;

FIG. 6 is a view showing a product information table according to the embodiment;

FIG. 7 is a view showing a user product table which manages user's registered products in the embodiment;

FIG. 9 is a view showing a user information setting window according to the embodiment;

FIG. 10 is a view showing a user purchased product information setting window according to the embodiment;

FIG. 13 is a view showing notification mail transmitted when a transmission button is clicked on in the mail notification window according to the embodiment;

FIG. 14 is a view showing a window displayed when a browsing user accesses a URL described in the notification mail in the embodiment;

FIG. 17 is a view showing another example of the image information table which stores information related to each image in the embodiment;

FIG. 18 is a view showing another example of the user information table according to the embodiment;

FIG. 19 is a view showing another example of the contents of the archive period data table according to the embodiment;

FIG. 23 is a view showing an example of an image information table 300C which stores information related to each image stored in an information DB 118 of the photo site 105 according to the third embodiment of the present invention;

FIG. 24 is a view showing an example of a user information table 400C stored in the information DB 118 of the photo site 105 according to the third embodiment of the present invention;

FIG. 25 is a view showing an example of a charging information table 2500 used by the system of the photo site according to the third embodiment of the present invention;

FIG. 26 is a view showing an example of an order information table 2600 related to the photo site 105 according to the third embodiment of the present invention;

FIG. 27 is a view showing an example of a user information setting window 900B generated by the photo site 105 according to the third embodiment of the present invention;

FIG. 28 is a view showing an example of a use status confirmation window 2900 generated by the photo site 105 according to the third embodiment of the present invention;

FIG. 32 is a view showing an example of the format of data sent when the photo site 105 according to the third embodiment of the present invention sends a print order start notification to a print site 109;

FIG. 33 is a view showing an example of the format of data sent when the print site 109 according to the third embodiment of the present invention notifies the photo site 105 of estimate display information;

FIG. 34 is a view showing an example of the format of data sent when the photo site 105 according to the third embodiment of the present invention gives a formal print order to the print site 109;

DETAILED DESCRIPTION OF THE PREFERRED EMBODIMENTS

Preferred embodiments of the present invention will be described below with reference to the accompanying drawings. The relative layout of constituent elements, display windows, and the like described in the embodiments do not limit the scope of the present invention unless otherwise specified. A system that provides a print service will be described below as an information providing system. However, as described in the summary of the invention, the present invention is not limited to this, and any invention that solves common problems of services using a network is incorporated in the present invention.

<Arrangement and Basic Operation of Information Providing System of Embodiment>

An information providing system which shares and provides digital image data through the Internet will be described as the first embodiment of the present invention.

Figure 1:
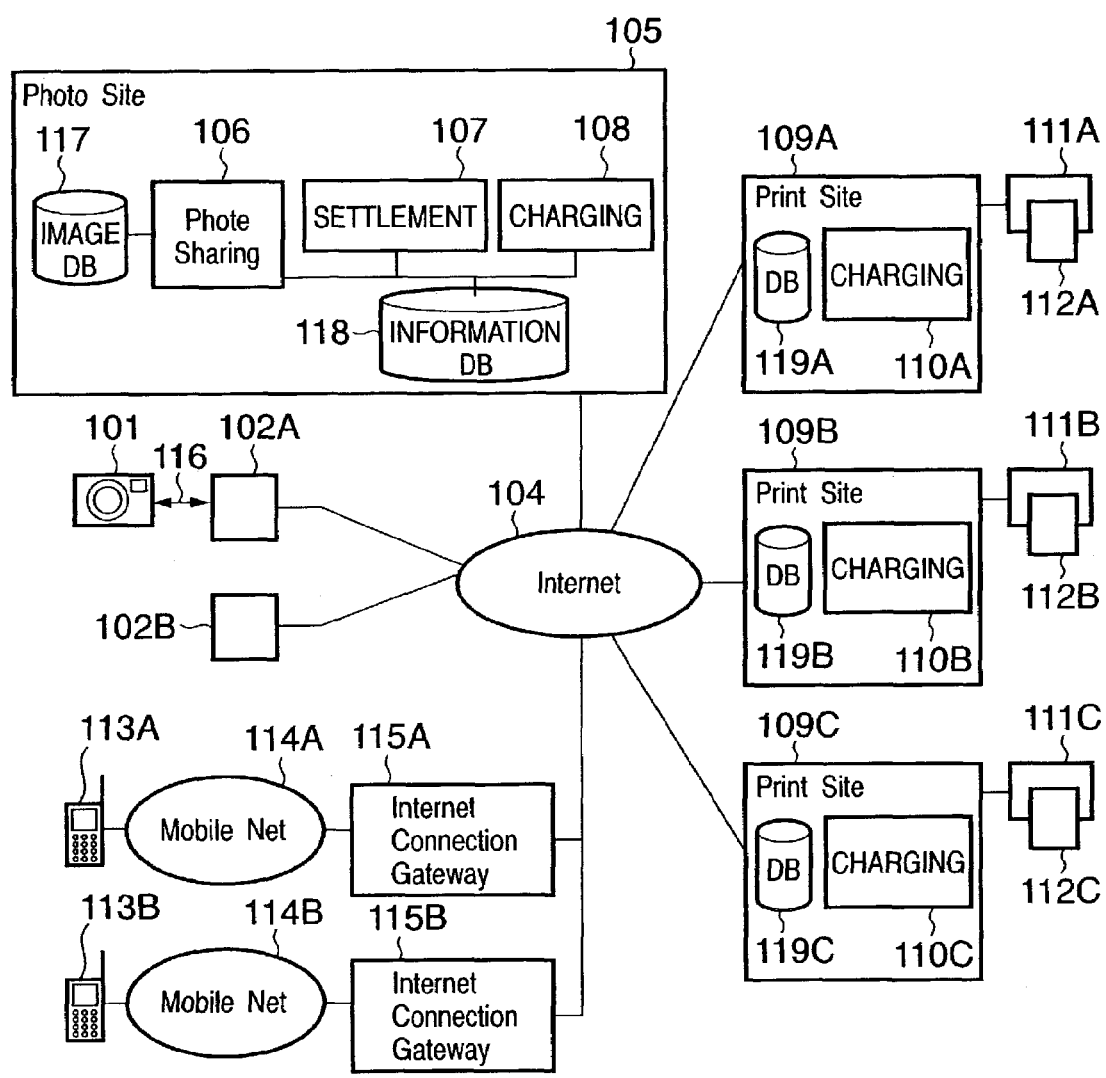
FIG. 1 is a view showing the schematic arrangement of an entire information providing system according to an embodiment.

FIG. 1 shows an entire system that constitutes a service in this embodiment. In the following description, a person concerned, who archives image data, will be simply referred to as a user and a third party will be referred to as a browsing user.

(Example of Image Data Acquisition)

An image input device 101 is a digital still camera capable of photographing an image and recording it as image data or a digital video camera. The image input device 101 is a device which converts an optical image as image information into an electrical signal, performs predetermined image processing, and records/plays back the image as digital information. Reference numeral 102A denotes a user personal computer (to be referred to as a user PC hereinafter); and 116, a data transfer interface used to transfer photographed image data between the image input device 101 and the user PC 102A. The data transfer interface 116 is a wired interface represented by USE or IEEE 1394 or a wireless interface represented by IrDA or Bluetooth.

Image data photographed by the image input device 101 and stored as digital information is transferred to a storage area of an information storage device represented by the HDD of the user PC 102A through the data transfer interface 116. To transfer image data from the image input device 101 to the user PC 102A, image data stored in the information storage device in the image input device 101 is transferred at once in accordance with an instruction from an OS or dedicated software installed in the user PC 102A. Alternatively, in accordance with a transfer command sent from the image input device 101, the OS or dedicated software in the user PC 102A ensures a data recording area in the information recording section of the user PC 102A and transfers image data.

The information providing system according to this embodiment can also use, as terminals used by users who receive the service, portable terminals 113A and 113B serving as a communication terminal such as a cellular phone or PHS that has a browser function or a PDA having a browser function capable of communication using an external or internal communication adapter.

The portable terminals 113A and 113B respectively access the Internet 104 through mobile networks 114A and 114B as networks of communications carriers and Internet connection gateways 115A and 115B serving as gateways between the mobile networks 114A and 114B and the Internet 104. Use of a photo site 105 from the portable terminals 113A and 113B will be described later.

(Example of Upload of Image Data)

The image data thus transferred to the user PC 102A is uploaded to the photo site 105 connected to the Internet 104 in accordance with the following procedure.

A browser which has a standard protocol capable of transferring information in the Internet 104 and operates on the user PC 102A accesses the photo site 105 using the standard protocol such as RTTP (HyperText Transfer Protocol) and displays information linked with multimedia information such as image and audio data generated by a description language such as HTML (HyperText Markup Language) and managed by the server PC of the photo site 105. With this operation, the user PC 102A can receive a service provided by the photo site 105 using the Internet 104.

The image data photographed by the image input device 101 and stored in the information storage area of the user PC 102A is transferred to the photo site 105 in accordance with a request from the user of the user PC 102A (this transfer will be referred to as image upload hereinafter). For image upload, image data to be transferred is selected from the above-described browser and transferred in synchronism with an image upload request action. Alternatively, image data is selected using software dedicated to image upload and directly transferred for the above-described software dedicated to image upload. In either case, transfer is executed on the basis of a protocol such as HTTP or FTP (File Transfer Protocol) usable on the Internet. A module that executes the series of operations in the photo site 105 is a photo sharing module 106.

The photo sharing module 106 checks whether the uploaded image data is data usable in the photo site 105. If it is determined that the data is usable, the uploaded image is stored in an image database (DB) 117, and the attribute information and the like of the image data are stored in an information database 118. At this time, the photo sharing module 106 notifies the user PC 102A that the image data has normally been updated.

The information database 118 also systematically manages the data of user attribute information registered in the photo site 105 and various kinds of data such as attribute information of print service providers 109A to 109C (to be referred to as print sites hereinafter) that request printout of uploaded image data as well as the above-described attribute information of the image data. The user of the user PC 102A can browse any one of the uploaded image data by designating it. For this browsing, a plurality of uploaded image data may be managed as an album.

(Example of Printing of Image Data)

The flow of placing a print order of uploaded image data will be sequentially described next. The user of the user PC 102A can browse, through the browser, the image data uploaded to the photo site 105 by himself/herself. To select an image to be browsed, each image to be browsed is selected as a single image. Alternatively, as described above, a plurality of images are registered as one album, an album to be browsed is selected from a plurality of albums, and each image managed in the selected album is selected and browsed.

The photo site 105 sends a print request for the image data uploaded by the user to a print site that provides image data printout as a solution. Such print providers are the print sites 109A to 109C. FIG. 1 shows three print sites for the illustrative convenience. However, at least one or any number of print sites can be arranged.

The user of the user PC 102A selects image data to be printed as merchandise from the browsing window of the uploaded images. Next, the user of the user PC 102A selects a print site to which he/she wants to give a print order from the print sites 109A to 109C that can be provided by the photo site 105. The user selects a print site to which he/she should give an order in consideration of the service, price, and date of delivery provided by each print site. It is assumed that the user has selected the print site 109A for the descriptive convenience. The basic flow of information is the same even when the user has selected the print site 109B or 109C.

The user who wants to place a print order selects image data for the print order from the browsing window and notifies the photo site 105 of the image data. The photo site 105 generates a temporary print order for the printout-requested image data and sends an estimate request to the print site 109A through the Internet 104. Upon receiving the temporary print order from the photo site 105, the print site 109A causes a charging module 110A serving as a charging means to calculate the price on the basis of the contents of the temporary print order and notifies the photo site 105 of the estimated price through the Internet 104. The photo site 105 receives the information of the estimated price in real time and transfers it to the user PC 102A as information. In this way, the price presented by the print site 109A can be presented in real time to the user who will give a print order.

When the user of the user PC 102A that will place a print order approves purchase at the presented price and returns an approval action to the photo site 105, a settlement module 107 accepts it and executes settlement processing. When settlement is ended, the photo site 105 sends a formal print order to the print site 109A. Upon accepting the formal print order, the print site 109A acquires image data necessary for printout from the database of the photo site 105. The thus acquired image data is output as printed matter 112A by a print means 111A of the print site 109A. The printed matter 112A is sent to a delivery destination designated by the user of the user PC 102A that has requested printout by a distribution system such as mail or a home delivery service.

The system in which the user who has uploaded image data photographed by the image input device 101 browses the photo site 105 and gives a print order through the user PC 102A has been schematically described above. In this example, a user PC is used as a terminal used to upload an image. However, an image may be uploaded from a portable terminal with a camera or directly from an image input device such as a digital camera, digital video, scanner, or copying machine.

(Example of Browsing Processing of Third Party)

A method of allowing a third party except the user who has uploaded image data to the photo site 105 to browse, through the Internet 104 using a PC 102B, image data uploaded to the photo site 105 and stored in the database 117 will be described. The photo site 105 provides to a third party designated by the user who has uploaded image data a browsing and print order service of an "uploaded image" or an "album that manages a plurality of uploaded images as one archive".

The user who has uploaded image data to the photo site 105 notifies, using a web browser 120A, the photo site 105 of the attribute information such as a name and the e-mail address of a user (to be referred to as a browsing user hereinafter) to which he/she grants permission to browse image data. To make the image open to the browsing user, the photo site 105 generates a URL (Uniform Resource Locator) necessary for making the image open. As the URL to be generated, a unique address using a random number or the like, which cannot be uniquely predicted (the URL that cannot be uniquely predicted will be referred to as a random URL) is assigned. An example will be described below. http://○○○.com/Photo-Site/Album/AlbumEntry.cgi?AlbumID=A.INWDMF The photo site 105 adds password information necessary for browsing to the generated random URL, as needed, and notifies the browsing user of the random URL by e-mail through the Internet 104. The browsing user who has received the e-mail can browse the image or album designed by the user who has uploaded the image by accessing the Internet 104 from the user PC 102B and inputting the random URL notified by a web browser 120B by e-mail.

(Example of Print Order by Third Party)

A method of causing the browsing user who uses the user PC 102B to place, using the user PC 102B, a print order of image data that can be browsed will be described. The photo site 105 gives an image data print order from the browsing user to one of the print sites 109A to 109C that provide image data printout.

The browsing user of the user PC 102B selects, from the browsing window, image data to be printed and obtained as merchandise. Next, the browsing user who uses the user PC 102B selects the print site 109 to which an order is to be given from the print sites 109A to 109C provided by the photo site 105. The browsing user selects the print site 109 to which he/she should give an order in consideration of the service, unit price, and date of delivery provided by each print site. It is assumed for the descriptive convenience that the user has selected the print site 109B. The basic flow of information is the same even when the user has selected the print site 109A or 109B, and a description thereof will be omitted.

When the browsing user selects image data for which a print order is to be placed and notifies the photo site 105 of it, the photo site 105 generates a temporary print order for the printout-requested image data and transmits an estimate request to the print site 109B through the Internet 104. Upon receiving the temporary print order from the photo site 105, the print site 109B acquires image data necessary for the selected image information from the image database 117 of the photo site 105 and generates selected image information. The selected image information is transmitted to the user PC 102B through the Internet 104 so that the browsing user can input, in the user PC 102B, the print format and the number of prints for each of the images selected on the web browser 120B.

The print site 109B causes a fee calculation (charging) module 110B to calculate an estimate amount on the basis of the information such as the print format and the number of prints for each selected image, and transmits the calculated estimate amount to the photo site 105 through the Internet 104. The photo site 105 receives the information of the estimate amount transmitted from the print site 109B in real time. If the photo site 105 has no user personal information of the browsing user, the photo site 105 transfers the estimate amount transmitted from the print site 109B to the user PC 102B as web information. If the photo site 105 has the user personal information of the browsing user, the photo site 105 transfers a presented amount obtained by adding a point as a privilege to the estimate amount as web information. In this way, the estimate information can be presented in real time to the browsing user who will give a print order.

When the browsing user of the user PC 102B that will place a print order approves purchase at the presented price and returns an approval action to the photo site 105, the settlement module 107 serving as a settlement means accepts it and executes settlement processing. When settlement is ended, the photo site 105 sends a formal print order to the print site 109B. Upon accepting the formal print order, the print site 109B acquires image data necessary for printout from the image database 117 of the photo site 105. The thus acquired image data is output as printed matter 112B by a printer 111B serving as a print means of the print site 109B. The printed matter 112B is sent to the browsing user of the user PC 102B that has requested the printout by a distribution system such as mail or a home delivery service.

A case wherein an image is browsed using the user PC 102, and a print order is placed has been described above. This can also be applied to a case wherein a portable terminal 113 is used, as is apparent.

<Arrangement of Photo Site of Information Providing System of Embodiment>

A method of causing the information providing system of this embodiment to automatically set the archive starting point date/time and archive time limit to efficiently delete image data that can be regarded to be already unnecessary without increasing the operation load on the system operator will be described below in detail. The service and function implemented by the system of this embodiment are not limited to those schematically described above.

(Functional Arrangement of Photo Site)

Figure 2:
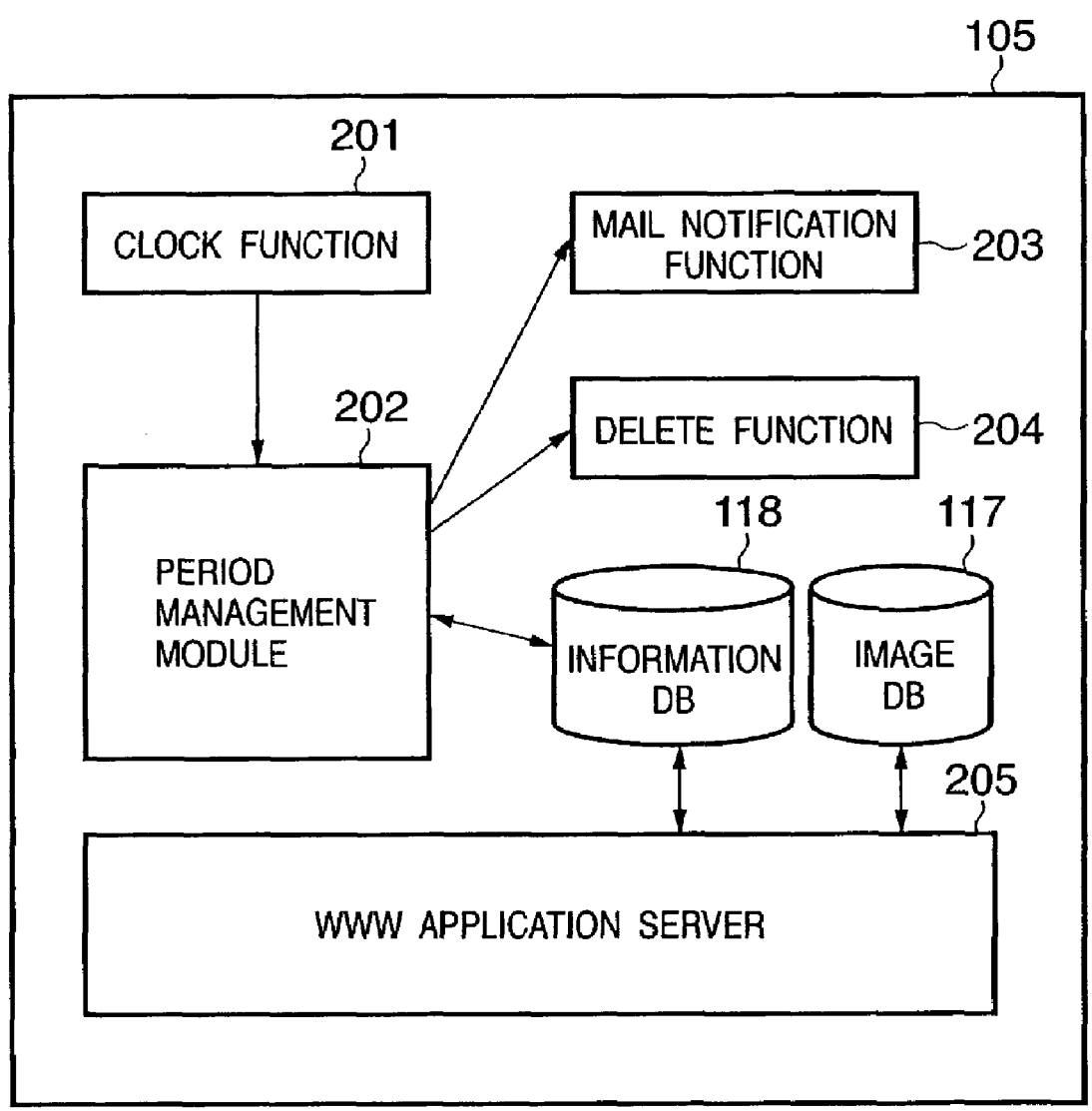
FIG. 2 is a view showing the arrangement of a photo site according to the embodiment.

FIG. 2 is a view showing the arrangement of the photo site 105 according to this embodiment. The photo site 105 can be practiced by causing a general-purpose computer apparatus that is normally commercially available as a personal computer to execute software that implements the following functions.

The information database (DB) 118 is a database serving as a user information management means for storing various kinds of information necessary for providing a service, e.g., user information, charging information, image information, album information, and the like. Tables that manage these pieces of information will be described later in detail.

The image database (DB) 117 is a database which stores image data uploaded by the user.

Reference numeral 201 denotes a clock function. This is the clock function of a computer, which can, e.g., generate a notification of current time used by a server application program, generate an interrupt signal at a preset time, or generate an activation notification of another application. When the clock function is used, an allowable disk use amount management module 202 is automatically invoked at a predetermined period, in this embodiment.

A WWW application server 205, i.e., a so-called web server communicates with the user terminal 102 or 113 or the print site 109 through the Internet 104 using a protocol such as HTTP or FTP and provides information and/or a service. In this embodiment, the photo sharing module 106 and settlement module 107 shown in FIG. 1 are included in the WWW application server 205.

Reference numeral 202 denotes a time limit management module. The time limit management module 202 checks whether each user image uploaded by the user of the photo site 105 through the WWW application server 205 has expired. The time limit management module 202 can send mail to a user who owns an image that has expired using a mail notification function 203 or delete an image that has expired using a delete function 204.

(Arrangements of Various Kinds of Tables)

FIG. 3 is a view showing an image information table 300 which stores information related to each image stored in the information DB 118 of the photo site 105 according to this embodiment. One record is generated for each image.

In this embodiment, each image has an image ID 301, a user ID 302 of the owner of the image, a title (image name) 303 used for the image, a file path 304 of the original image on the image DB 117, a file path 305 to a thumbnail image displayed on the web, a file path 306 to a detailed display image on the web, a comment 307 set for the image by the owner, a number 308 of times of image browsing by a third party for a notification sent from the image owner to the third party, a number 309 of times of print order of the image, a date/time 310 of creation of the image, a date/time 311 of the latest mail notification from the image owner to the third party, a date/time 312 of the latest editing of the image, a date/time 313 of the latest print order of the image, and a date/time 314 of the latest browsing of the image (the latest access to the image). The dates/times 310 to 314 are held in total number of seconds from "0" defined at 0:0:0 am on Jan. 1, 1970. However, any other format capable of specifying a date/time can be used.

FIG. 4 is a view showing a user information table 400 stored in the information DB 118 of the photo site 105 according to this embodiment.

The user information table 400 stores a user ID 401, user names (402 to 405), a login name 406, a password 407, a notification mail address 408 to the user, user addresses (409 to 412), a telephone number 413, a data archive period 414, and a data archive upper limit size 415.

FIG. 5 is a view showing an archive time limit table 500 used in the photo site 105 according to this embodiment.

The archive time limit table 500 stores an archive period starting point type 501 at the time of user registration, an initial value 502 of the data archive upper limit size, and an initial value 503 of the data archive period. When the archive period starting point type 501 is "1", the starting point of the archive period is the date/time of creation of the image. When the archive period starting point type 501 is "2", the starting point of the archive period is the date/time of the latest mail notification. When the archive period starting point type 501 is "3", the starting point of the archive period is the date/time of the latest editing. When the archive period starting point type 501 is "4", the starting point of the archive period is the date/time of the latest print order. When the archive period starting point type 501 is "5", the starting point of the archive period is the date/time of the latest browsing (the latest access to the image). In this embodiment, to allow the operator of the photo site to appropriately change the set values while monitoring the disk use status, the archive period starting point type 501, the initial value 502 of the data archive upper limit size, and the initial value 503 of the data archive period are stored on the database. However, these values need not always be set on the database. The values may be set anywhere as long as certain values can be set on the system. Alternatively the values may be fixed on the system.

FIG. 6 is a view showing a product information table 600 related to the photo site 105 according to this embodiment.

A product ID 601, a product name 602, an upper limit additional disk size 603 for a user who has purchased the product corresponding to the product ID, and an additional image archive period 604 are registered in the product information table 600 in correspondence with each product.

FIG. 7 is a view showing a user product table 700 which manages the registered products of a user of the photo site 105 according to this embodiment. A user ID 701, a product ID 702 of a product purchased by the user, a product purchase date 703, and a registration date 704 are registered in the user product table 700.

<Operation of Photo Site of Information Providing System of Embodiment>

Figure 8:
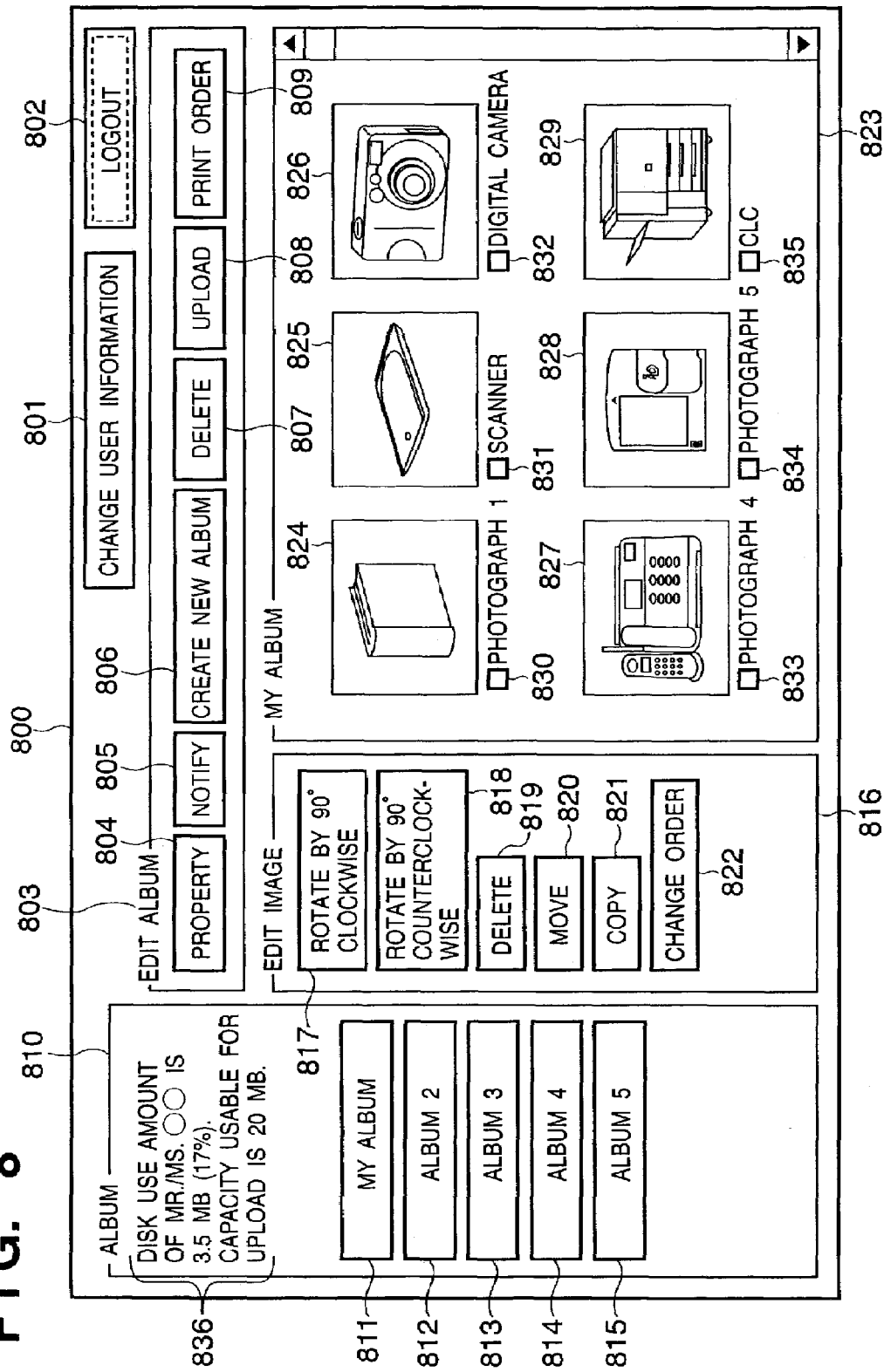
FIG. 8 is a view showing an album editing window displayed when a user logs in to the photo site according to the embodiment.

FIG. 8 is a view showing an album editing window 800 displayed on the user terminal when the user logs in to the photo site according to this embodiment. In this embodiment, user images are archived as groups (albums) containing one or a plurality of images.

Figure 12:
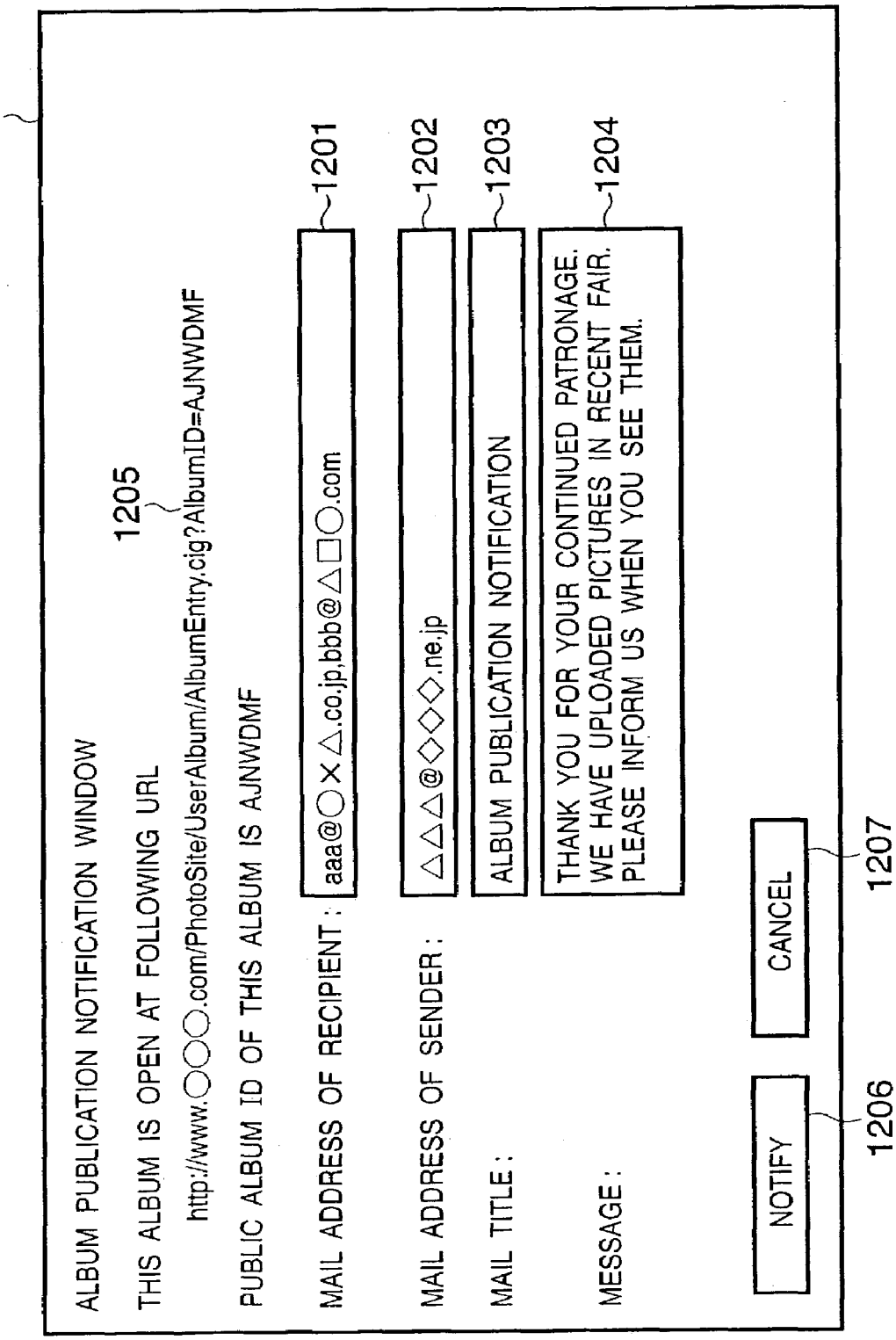
FIG. 12 is a view showing a mail notification window according to the embodiment.

A button 801 in the window 800 is a user information change button. When the button 801 is clicked on, a user information setting window 900 (to be described below) shown in FIG. 9 is displayed. A button 802 is a logout button. Buttons used for editing operation for albums displayed on this window are laid out in a region 803. A button 804 is a button used to set the property of an album. A button 805 is an album notification button. When the button 805 is clicked on, a mail notification window 1200 (to be described below) shown in FIG. 12 is displayed.

Figure 11:
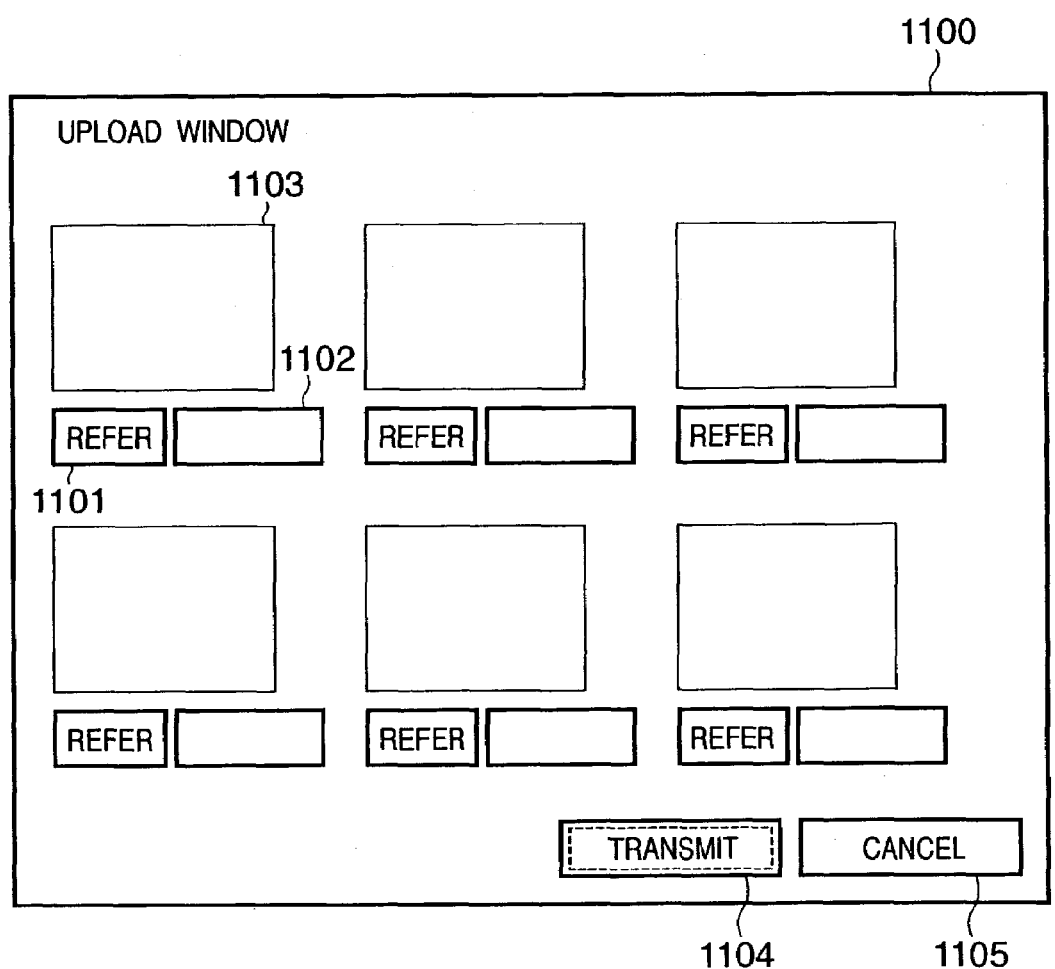
FIG. 11 is a view showing an image upload window according to the embodiment.

A button 806 is a new album create button. A button 807 is an album delete button. A button 808 is an image upload button. When the button 808 is clicked on, an image upload window 1100 (to be described below) shown in FIG. 11 is displayed.

A button 809 is a print order button. When the print order button is clicked on, a detail window of print information for an image with a checkmark in a corresponding one of checkboxes 830 to 835 is displayed, and a print order is placed.

Buttons for album selection are displayed in a region 810. At an upper portion 836 of this region, the total data size of images that the user has archived (uploaded) on the photo site 105, the ratio of the total data size to the allowable use amount, and the allowable use amount are displayed. Buttons equal in number to albums created by the user are laid out on the lower side. Referring to FIG. 8, it can be confirmed that the user has created five albums because buttons 811 to 815 are laid out. When a button is clicked on, the photo site 105 changes images displayed in an album display region 823 in accordance with the selected album and displays the album name of the album at the upper left corner of the album display region.

Buttons for editing for each image in an album are laid out in a region 816. When one of buttons 817 to 822 is clicked on, editing processing corresponding to the button is performed for an image which is displayed in the region 823 and has a checkbox with a checkmark. When this operation is executed, the date/time of editing is set in the editing date/time 312 of the image information table 300 related to the edited image.

The region 823 is an album image display region. In this region, images stored in an album are sequentially displayed, and checkboxes corresponding to the images are laid out. When an image is clicked on, the property settling window of the image is displayed.

(Archive Starting Point Date/Time Update Timing)

(Update of Image Creation Date/Time: Archive Starting Point Type 501="1")

FIG. 11 shows the upload window 1100 displayed when the "upload" button 808 shown in FIG. 8 is clicked on. After an image on the user PC 102 is selected, a transmission button 1104 is clicked on. The selected image is transmitted to the photo site 105 through the network 104. The transmitted image is registered in the album that is currently selected. The image information table 300 is generated for each registered image. The creation date/time 310 is initialized to the date/time of image registration.

(Update of Latest Mail Notification Date/Time: Archive Starting Point Type 501="2")

FIG. 12 shows the mail notification window 1200 displayed when the "notification" button 805 shown in FIG. 8 is clicked on. When a transmission button 1206 is clicked on, album publication notification mail is transmitted to a mail address described in a recipient mail address 1201. Simultaneously with the mail transmission, the mail notification date/time 311 of the image information table 300 related to each image in the album is updated to the mail transmission date/time.

(Update of Latest Editing Date/Time: Archive Starting Point Type 501="3")

When one of the buttons 817 to 822 in FIG. 8 is clicked on, editing processing corresponding to the button is performed for an image which is displayed in the region 823 and has a checkbox with a checkmark. When this operation is executed, the date/time of editing is set in the editing date/time 312 of the image information table 300 related to the edited image.

(Update of Latest Print Order Date/Time: Archive Starting Point Type 501="4")

When the print order button 809 in FIG. 8 is clicked on, a detail window of print information for an image with a checkmark in a corresponding one of the checkboxes 830 to 835 is displayed, and a print order is placed. A detailed description of the print order will be omitted here. The print order date/time is set to the print order date/time 313 of the image information table 300 related to the image for which the print order is placed, and the number 309 of times of printing is incremented by one.

(Update of Latest Browsing Date/Time: Archive Starting Point Type 501="5")

FIG. 13 shows an example of notification mail transmitted when the transmission button 1206 is clicked on in the mail notification window 1200 of this embodiment shown in FIG. 12. The user (to be referred to as a browsing user) who has received this mail can display the images of the album in the photo site 105 on his/her PC 102B by accessing the URL described in the notification mail.

FIG. 14 is a view showing a window displayed when the browsing user accesses the URL described in notification mail 1300 according to this embodiment. The thumbnail images of images held by the album owner are transferred to and displayed on the PC 102B of the browsing user. At this time, the photo site 105 sets the date/time of the browsing user's access to the photo site 105 in the browsing date/time 314 of the image information table 300 related to each image transmitted for display and the number 308 of times of browsing is incremented by one. In this example, the date/time of access to each image is set. However, the access date/time 314 and the number 308 of times of browsing may be updated only when the browsing user performs operation such as mouse click on a thumbnail image 1401 displayed in a browsing window 1400 and requests to display detailed information or image. When the browsing user selects some of the browsing images and places a print order, the print order date/time 313 of the image information table 300 is updated, like a case wherein the album owner places a print order.

(Calculation/Change of Archive Period of Embodiment)

FIG. 9 is a view showing the user information setting window 900 in the photo site 105 of this embodiment, which is displayed on the user terminal when the user information change button 801 in FIG. 8 is clicked on. The user information setting window 900 is also displayed for new user registration in the photo site 105.

When a register button 917 is clicked on in the user information setting window 900, contents input to an e-mail address 901 are set to the mail address 408 of the user information table 400, contents input to a login name 902 are set to the login name 406 of the user information table 400, contents input to a password 903 are set to the password 407 of the user information table 400, contents input to name input regions 904 to 907 are set to the names 402 to 405 of the user information table 400, information input to zip codes 908 and 909 is set to the zip code 409 of the user information table 400, information input to a prefecture 910 is set to the prefecture 410 of the user information table 400, contents input to address input regions 911 and 912 are set to the addresses 411 and 412 of the user information table 400, and contents input to telephone numbers 913, 914, and 915 are set to the telephone number 413 of the user information table 400. When a purchased product information setting button 916 is clicked on, a purchased product information setting window 1000 is displayed.

FIG. 10 is a view showing the setting window 1000 of purchased products from the user terminal in the photo site 105 according to this embodiment.

The list of products registered in the product information table is set in a pull-down list 1001. When the user selects a purchased product from the list, inputs the serial number to a serial number input region 1002, inputs the purchase date to input regions 1003, 1004, and 1005, and clicks on an "add product" button 1006, the product information is added to a purchased product list display region 1008. When the "add product" button 1006 is clicked on, it is checked whether the serial number is correct. Only products having correct serial numbers are displayed. Products having wrong serial numbers are not added to the purchased product list display region 1008.

When a "delete check-marked product" button 1007 is clicked on, display of a product with a checkbox indicating a selected state on the left of the product in the products displayed in the purchased product list display region 1008 is turned off. In the window 1000 shown in FIG. 10, three products are registered, and checkboxes 1009, 1010, and 1011 are displayed in correspondence with the registered products.

When an OK button 1012 is clicked on, the user's product registration state of the user product table 700 is updated to the product information currently displayed in the purchased product display list 1008, and the user information setting window 900 is displayed again. More specifically, all records having the user ID as the user ID 701 are searched for from the user product table 700. A record whose serial number is not present in the purchased product display list 1008 is deleted. For a record having a serial number in the list and a purchase date different from that of the purchased product display list 1008, the purchase date is updated to the value in the purchased product display list 1008, and the current date/time is registered as the registration date. For a product having a serial number only in the purchased product display list 1008, a record is newly created in the user product table 700, and product information is registered.

When a cancel button 1013 is clicked on, the operation performed on the user purchased product information setting window 1000 is canceled. The user information setting window 900 is displayed again without updating the contents of the user product table 700.

Figure 15:
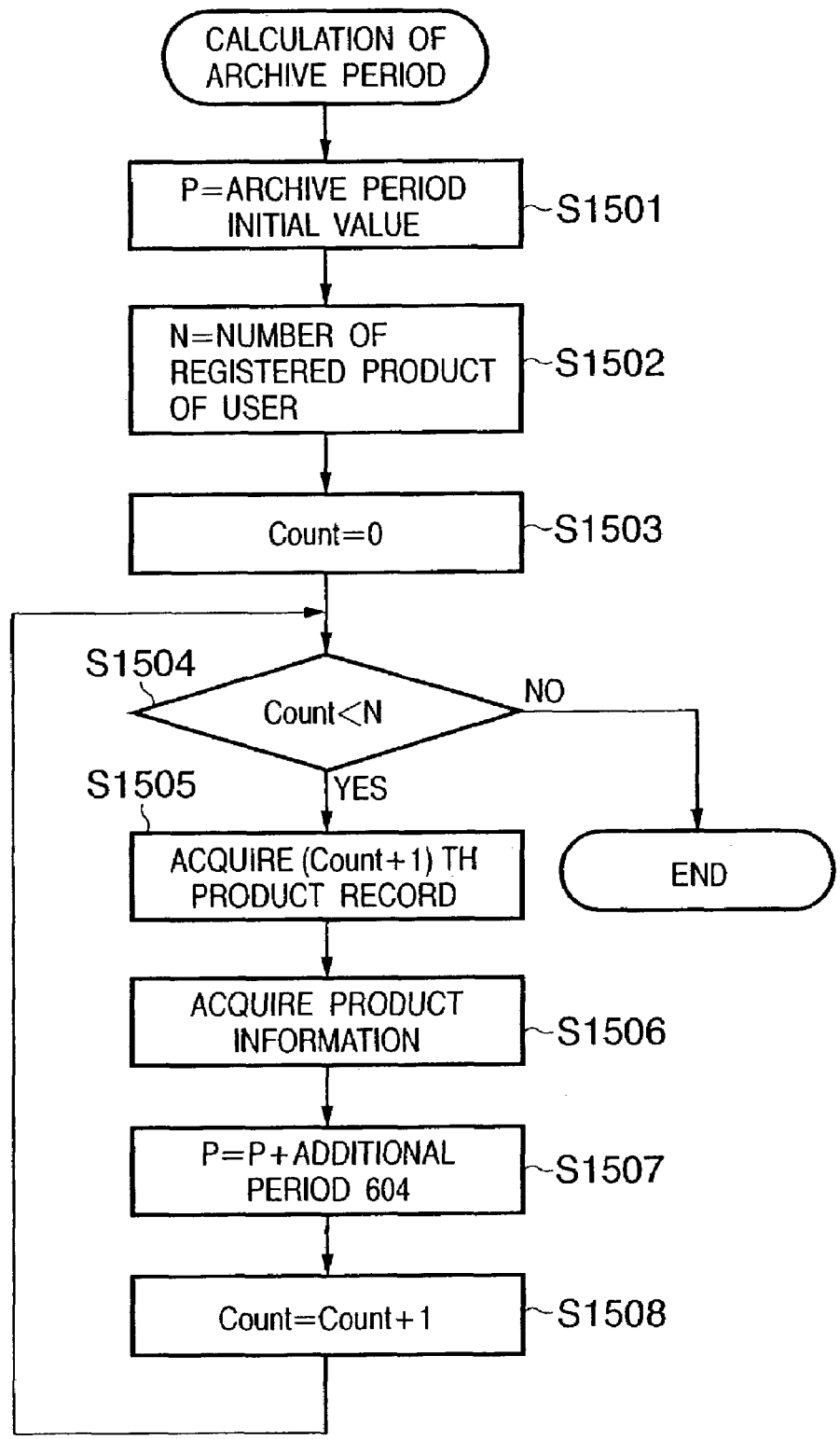
FIG. 15 is a flow chart showing processing of calculating a data archive period for each user in the embodiment.

FIG. 15 is a flow chart showing processing of calculating a data archive period for each user in this embodiment.

In step S1501, an initial value P of the archive period is obtained. The initial value of the archive period can be obtained from the initial value 503 of the archive period of the archive period table 500. In step S1502, a record having, as the user ID 701, the user ID of the user for which the archive period is to be calculated is searched for from the user product table 700, and the number of records is substituted into N. In step S1503, a variable Count that counts the number of records is initialized to "0".

In step S1504, it is determined whether Count is smaller than N. If YES in step S1504, the flow advances to step S1505. In step S1505, the (Count+1)th record detected from the user product table 700 is acquired. In step S1506, a record having, as the product ID 601, the product ID 702 of the acquired record is acquired from the product information table 600. In step S1507, the additional period 604 of the record acquired from the product information table 600 is added to the archive period P. In step S1508, Count is incremented by one, and the flow returns to step S1504.

If Count becomes larger than N in step S1504, the processing is ended. P at this time is the obtained archive period and is registered in the data archive period 414 from the user information table 400 of the user.

In FIG. 15, the archive period is obtained. When the initial value 502 of the archive size is used in place of the initial value 503 of the archive period in step S1501, and the additional disk size 603 is used in place of the archive period 604 in step S1507, a usable disk size for each user can be obtained. The obtained disk size is registered in the data archive upper limit size 415 from the user information table 400 and displayed in the region 810 of the album editing window 800.

(Delete of Image which has Expired)

Figure 16:
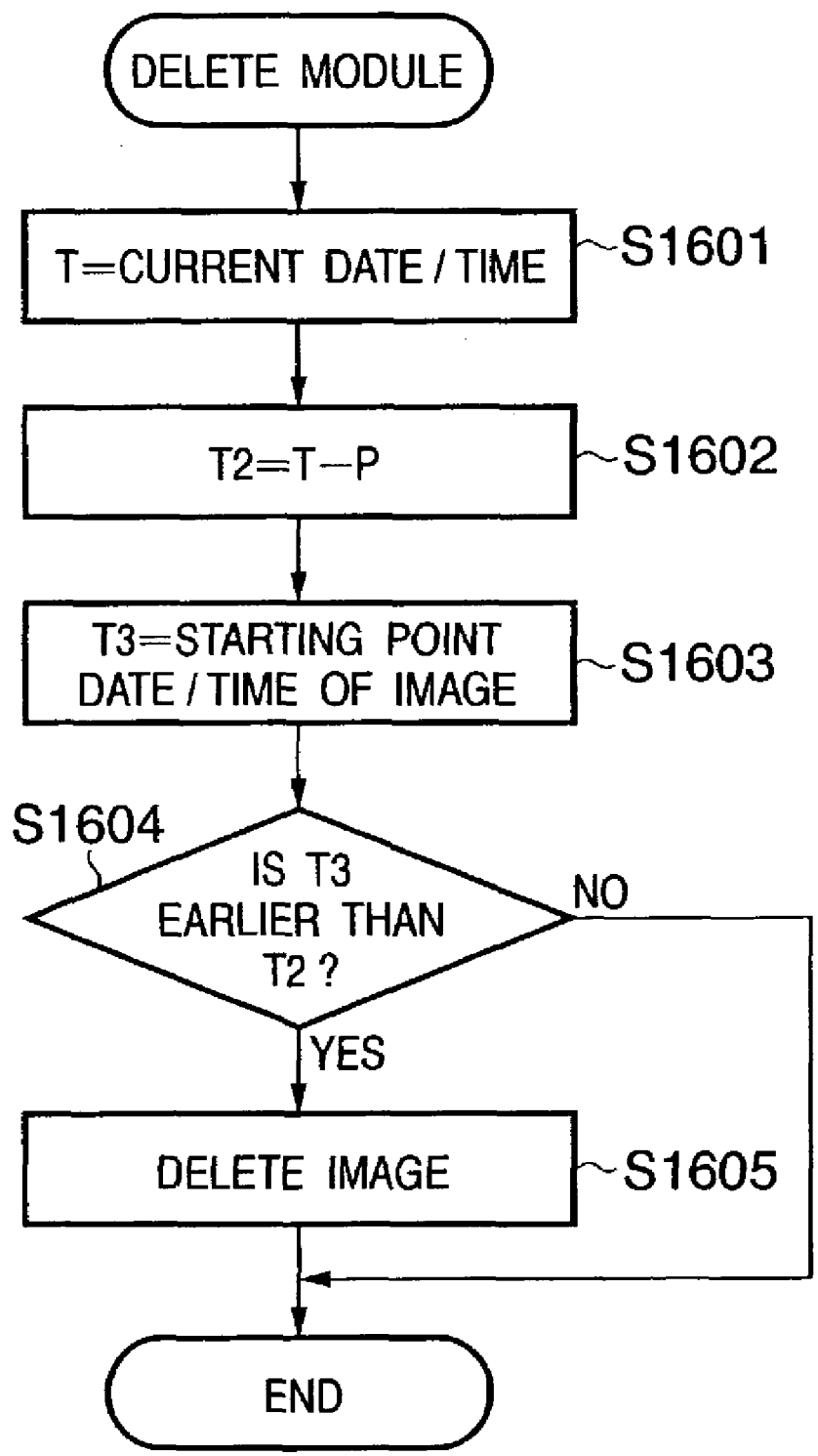
FIG. 16 is a flow chart showing an example of processing of an image delete module according to the embodiment.

FIG. 16 is a flow chart showing processing of an image delete module according to this embodiment. The delete module is automatically activated at a predetermined date/time preset in the clock function 201 of the photo site 105, and for example, once a week or once a month to check expiration of all images owned by each user registered in the photo site 105.

In step S1601, a current time T is acquired. The current time T can be acquired by the clock function 201 of the photo site 105. In step S1602, a time T2 is obtained by subtracting the archive period P from the current time T. P is obtained from the data archive period 414 of the user information table 400 of the user. In step S1603, a starting point time T3 necessary for determination of an image to be deleted is obtained. The starting point time T3 can be acquired from the image information table 300 in accordance with the value set in the archive period starting point type 501 of the archive time limit table 500.

In step S1604, T2 and T3 are compared. If T3 is earlier than T2, the image data should be deleted. The flow advances to step S1605. If T2 is earlier than T3, the image data is not regarded as an image to be deleted, and the processing for the image is ended. In step S1605, the image is deleted. Deleting an image means that a corresponding image file is deleted from the image DB 117, and a record on the image information table, which corresponds to the image to be deleted, is deleted from the information DB 118.

When the above-described processing is executed for each image registered in the photo site 105, images that have not been used by the user for a predetermined period can be automatically deleted.

Second Embodiment

It is often preferable for users that they be notified before images which satisfy delete conditions are automatically deleted from images for which a predetermined period have elapsed. An embodiment in which a user is notified after the elapse of a predetermined period, and an image that satisfies delete conditions is deleted after the elapse of a predetermined period from the notification time will be described.

FIG. 17 is a view showing an image information table 300B which stores information related to each image stored in an information DB 118 of a photo site 105 according to this embodiment.

In this embodiment, each image has an image ID 301, a user ID 302 of the owner of the image, a title (image name) 303 used for the image, a file path 304 of the original image on the image DB 117, a file path 305 to a thumbnail image displayed on the web, a file path 306 to a detailed display image on the web, a comment 307 set for the image by the owner, a number 308 of times of image browsing by a third party for a notification sent from the image owner to the third party, a number 309 of times of print order of the image, a date/time 310 of creation of the image, a date/time 311 of the latest mail notification from the image owner to the third party, a date/time 312 of the latest editing of the image, a date/time 313 of the latest print order of the image, a date/time 314 of the latest browsing of the image (the latest access to the image), and a delete notification flag 1701. The dates/times 310 to 314 are held in total number of seconds from "0" defined at 0:0:0 am on Jan. 1, 1970. However, any other format capable of specifying a date/time can be used.

The delete notification flag 1701 is a flag that determines whether a notification to the user has been sent before an image is deleted. In a delete notification state, "1" is stored in the delete notification flag 1701. Otherwise, "0" is stored.

FIG. 18 is a view showing a user information table 400B stored in the information DB 118 of the photo site 105 according to this embodiment.

The user information table 400B stores a user ID 401, user names (402 to 405), a login name 406, a password 407, a notification mail address 408 to the user, user addresses (409 to 412), a telephone number 413, a data archive period 414, a data archive upper limit size 415, and a delete advance notice flag 1802.

The delete advance notice flag 1802 is set to "1" when the user is notified of the presence of an image to be deleted from the images owned by the user. Otherwise, "0" is set. While the delete advance notice flag 1802 is "1", no new delete advance notification is sent. Hence, even when a plurality of images of the same user are to be deleted, notification mail is sent only once.

FIG. 19 is a view showing an archive time limit table 500B used in the photo site 105 according to this embodiment.

The archive time limit table 500B stores an archive period starting point type 501 at the time of user registration, an initial value 502 of the data archive upper limit size, a period 1901 until a data delete notification, and a period 1902 until data delete. When the archive period starting point type 501 is "1", the starting point of the archive period is the date/time of creation of the image. When the archive period starting point type 501 is "2", the starting point of the archive period is the date/time of the latest mail notification. When the archive period starting point type 501 is "3", the starting point of the archive period is the date/time of the latest editing. When the archive period starting point type 501 is "4", the starting point of the archive period is the date/time of the latest print order. When the archive period starting point type 501 is "5", the starting point of the archive period is the date/time of the latest browsing (the latest access to the image). In this embodiment, to allow the operator of the photo site to appropriately change the set values while monitoring the disk use status, the archive period starting point type 501, the initial value 502 of the data archive upper limit size, the period 1901 until a data delete notification, and the period 1902 until data delete are stored on the database. However, these values need not always be set on the database. The values may be set anywhere as long as certain values can be set on the system. Alternatively the values may be fixed on the system. The period 1902 until delete is set to be longer than the period 1901 until a notification.

The remaining tables and archive period calculation are the same as in FIGS. 6, 7, and 8 and FIGS. 14 and 15 of the first embodiment, and a description thereof will be omitted.

A method of sending a notification from the photo site 105 according to this embodiment to the owner of an image for which a predetermined period has elapsed and deleting an image after the elapse of a predetermined period from the notification time will be described.

(Delete Notification Processing Procedure)

Figure 20:
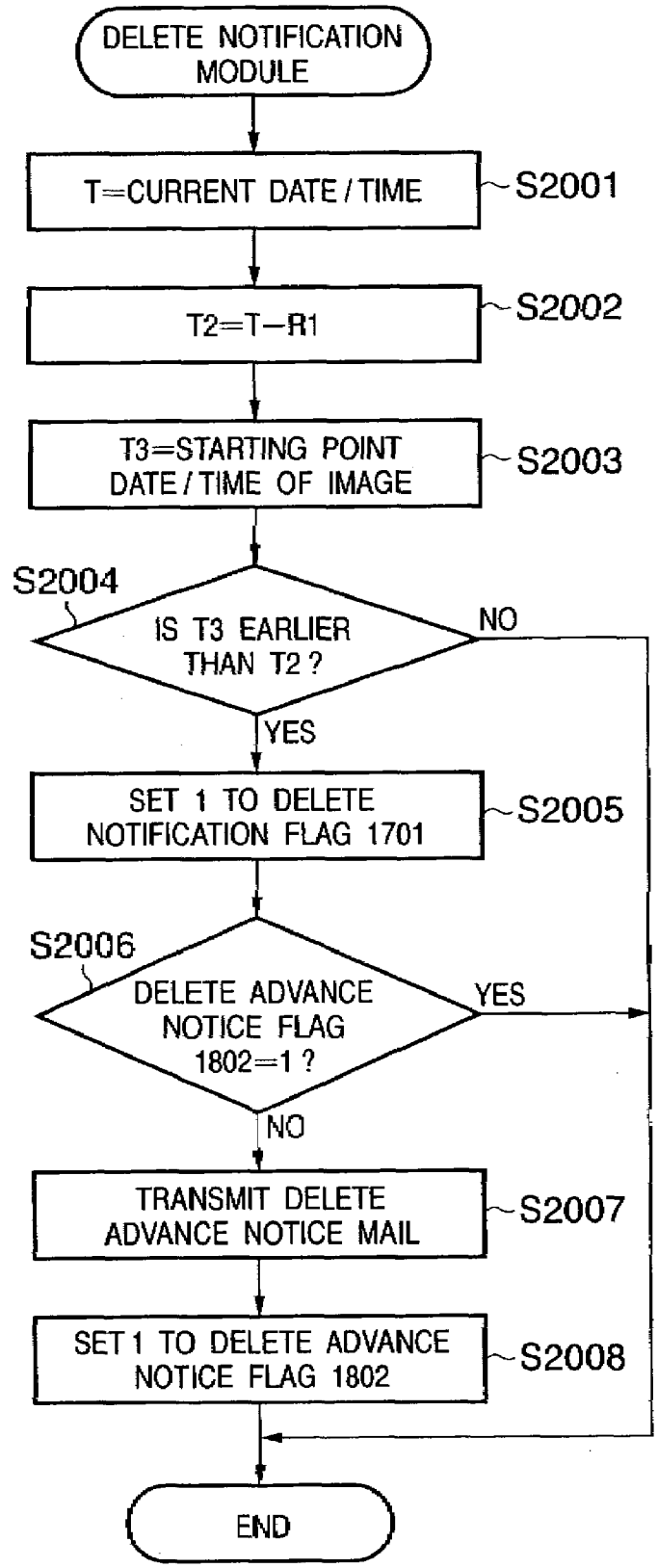
FIG. 20 is a flow chart showing the operation of an image delete notification module according to the embodiment.

FIG. 20 is a flow chart showing the operation of the image delete notification module according to this embodiment. The delete notification module is automatically activated at a predetermined date/time preset in a clock function 201 of the photo site 105, and for example, once a week or once a month to check expiration of all images owned by each user registered in the photo site 105.

In step S2001, a current time T is acquired. The current time T can be acquired by the clock function 201 of the photo site 105. In step S2002, a time T2 is obtained by subtracting a delete notification period R1 from the current time T. The delete notification period R1 is obtained from a period 1801 until a delete notification in the user information table 400B. In step S2003, a starting point time T3 necessary for determination of an image for which a delete notification is to be sent is obtained. The starting point time T3 can be acquired from the image information table 300B in accordance with the value set in the archive period starting point type 501 of the archive time limit table 500B.

In step S2004, T2 and T3 are compared. If T3 is earlier than T2, the image data should be deleted. The flow advances to step S2005. If T2 is earlier than T3, the image data is not regarded as an image for which a delete notification is to be sent, and the processing for the image is ended. In step S2005, "1" is set for the delete notification flag 1701 in the image information table 300B for the image data that is currently being processed.

In step S2006, it is determined whether the delete advance notice flag 1802 of the record related to the user information table 400B of the user is "1". If YES in step S2006, image delete advance notice notification mail has already been transmitted to the user, and the processing is ended. If the delete advance notice flag 1802 is "0", the flow advances to step S2007.

In step S2007, delete advance notice mail is transmitted. In step S2008, "1" is set to the delete advance notice flag 1802, and the processing is ended.

(Image Delete Processing Procedure)

Figure 21:
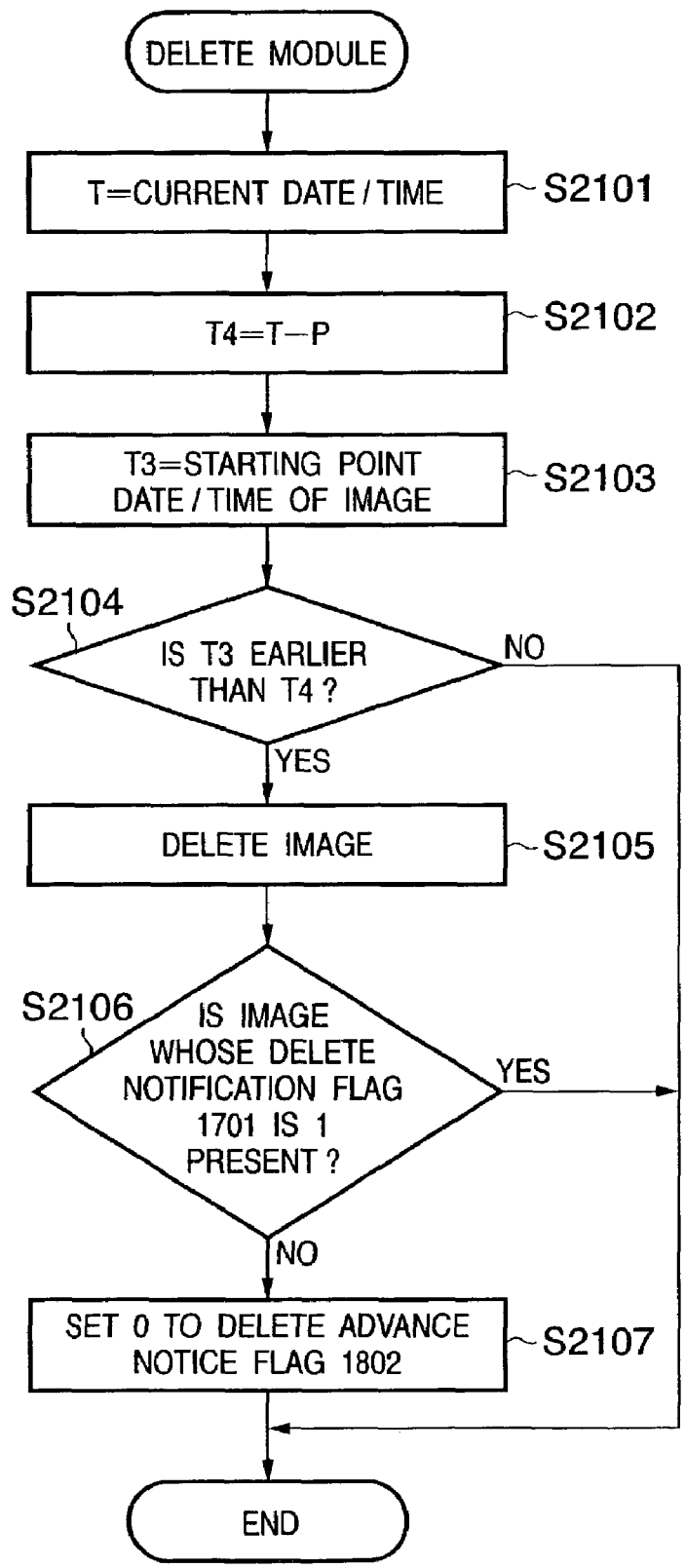
FIG. 21 is a flow chart showing another example of processing of the image delete module according to the embodiment.

FIG. 21 is a flow chart showing processing of the image delete module according to this embodiment. The delete module is automatically activated at a predetermined date/time preset in the clock function 201 of the photo site 105, and for example, once a week or once a month to check expiration of all images owned by each user registered in the photo site 105. The delete module may be set to be activated after the elapse of a predetermined time from activation of the delete notification module.

In step S2101, the current time T is acquired. The current time T can be acquired by the clock function 201 of the photo site 105. In step S2102, a time T4 is obtained by subtracting an archive period P from the current time T. P is a value acquired from the data archive period 414 of the user information table 400B of the user. In step S2103, the starting point time T3 necessary for determination of an image to be deleted is obtained. The starting point time T3 can be acquired from the image information table 300B by acquiring the date/time of the same item as that of T3 obtained in step S2003.

In step S2104, T4 and T3 are compared. If T3 is earlier than T4, the image data should be deleted. The flow advances to step S2105. If T4 is earlier than T3, the image data is not regarded as an image to be deleted, and the processing for the image is ended. In step S2105, the image is deleted. Deleting an image means that a corresponding image file is deleted from the image DB 117, and a record on the image information table, which corresponds to the image to be deleted, is deleted from the information DB 118.

In step S2106, a record having the user ID of the user is searched for from the image information table 300B, and it is checked whether a record having the delete notification flag 1701 set to "1" is present. If a record is detected, the processing is ended. If no record is detected, the flow advances to step S2107. In step S2107, "0" is set to the delete advance notice flag 1802 of the user information table 400B of the user, and the processing is ended.

When the above-described processing is executed for each image registered in the photo site 105, images that have not been used by the user can be automatically deleted.

In the above two embodiments, each image data is processed as a delete unit. The items 310 to 314 as delete determination conditions set in the above two embodiments may be managed as attribute information of an album. In this case, delete notification or delete can be performed for each album.

In the above embodiments, management of album print information in the photo site has been described. However, the same processing as described can be performed even in management by a print site or management by another server.

In the above embodiments, a system which provides a print service has been described as an information providing system. However, as described in the summary of the invention, the present invention is not limited to this, and any invention that solves common problems of services using a network is incorporated in the present invention.

As described above, according to the first and second embodiments, an information processing system, an information processing apparatus, an archive information management method, a storage medium which stores an information-processing-apparatus-readable program that implements the method, and a program, which allow to automatically change service use conditions without any load on an operator by controlling privileges in correspondence with the purchase information of each service user for product information related to a service, can be provided.

Especially, an information processing system, an information processing apparatus, an archive information management method, a storage medium which stores an information-processing-apparatus-readable program that implements the method, and a program can be provided, in which when a service user registers purchase information corresponding to product information related to a service in a network photo service, the image archive period or allowable archive capacity is increased to automatically change service use conditions in accordance with the product purchase state of the user, and images which are supposed to be unnecessary for the user can easily and automatically be deleted in accordance with the use conditions of the user without any load on the operator.

Third Embodiment

The third embodiment of the present invention will be described next. This embodiment provides an information providing server which can promote service use by a user without any load on the operator by automatically controlling a privilege to be given to the user in accordance with the user's service use status, and a control method for the server.

A photo site server as an example of an information providing server according to the present invention and a photo service system as an example of an information providing system using the information providing server, which provides an image browsing and print service shown in FIG. 1, will be described as representatives. The present invention can be applied to a general information providing server which provides a service and/or information through a network.

<Arrangement of Photo Site>

A method of causing the information providing system to efficiently manage image data to promote service use by a user without any operation load on the system operator by automatically controlling a privilege to be given to the user in accordance with the service use status of the user, and for example, by controlling to automatically set the archive starting point date/time and archive time limit of an image in this embodiment will be described below in detail. The service and function implemented by the system according to this embodiment are not limited to those described above.

(Functional Arrangement of Photo Site)

Figure 22:
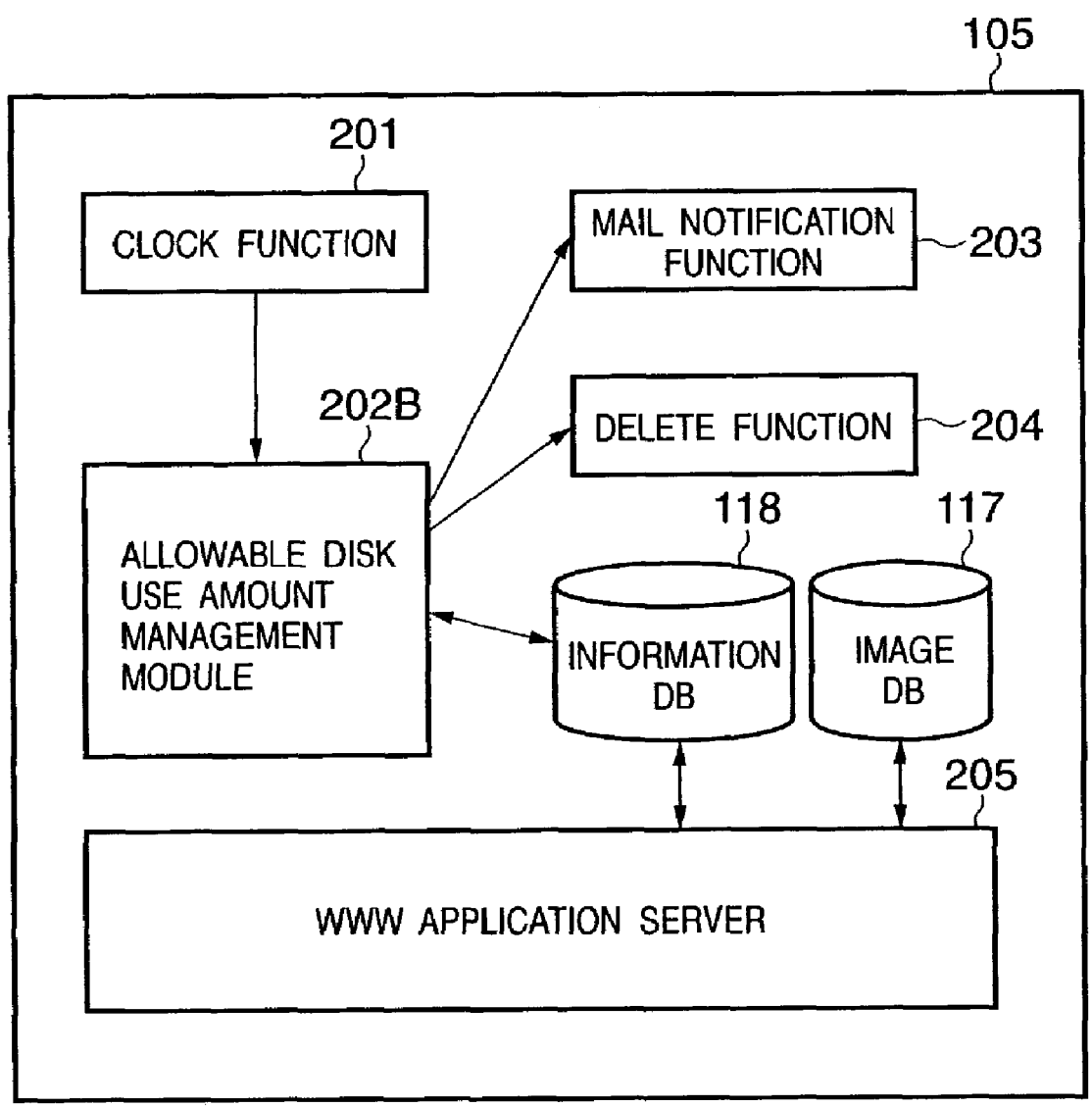
FIG. 22 is a view showing the functional arrangement of a photo site 105 according to the third embodiment of the present invention.

FIG. 22 is a view showing the functional arrangement of a photo site 105 according to this embodiment. The photo site 105 according to this embodiment has an arrangement common to as that of the photo site 105 (FIG. 2) described in the first embodiment except a allowable disk use amount management module 202B is arranged in place of the time limit management module 202. Hence, only the allowable disk use amount management module 202B as a different component will be described.

The allowable disk use amount management module 202B calculates the data archive upper limit size (allowable disk use amount) as an example of restrictions related to service providing to each user on the basis of a record of service providing to the user of the photo site 105 in a predetermined period, and for example, the number of times of print order or print order amount. The allowable disk use amount management module 202B also calculates the number of user images or the file size of images that a user of the photo site 105 has uploaded through a WWW application server 205 and compares the number of images or file size of images with the allowable disk use amount whereby a mail notification can be sent, using a mail notification function 203, to a user who owns images more than the allowable amount, or images more than the allowable use amount can be deleted using a delete function 204.

(Arrangements of Various Tables)

FIG. 23 is a view showing the arrangement of an image information table 300C which stores information related to each image stored in an information DB 118 of the photo site 105 according to this embodiment. One record is generated for each image. The same reference numerals as in the image information table 300 (FIG. 3) of the first embodiment denote the same items in FIG. 23. As is apparent from FIG. 3, the image information table 300C of the third embodiment uses only some items of the image information table 300 shown in FIG. 3, and a description of each item will be omitted.

FIG. 24 is a view showing the arrangement of a user information table 400C stored in the information DB 118 of the photo site 105 according to this embodiment. One record is generated for each user. Like the image information table 300C, the user information table 400C is also formed from some items of the user information table 400 described in the first embodiment. The same reference numerals as in the user information table 400 denote the same items in FIG. 24, and a description of each item will be omitted.

FIG. 25 is a view showing the arrangement of a charging information table 2500 stored in the information DB 118 of the photo site 105 according to this embodiment. In the charging information table, a new record is generate every time the user places a print order.

The charging information table 2500 stores an order ID 2501, a user ID 2502 of the user who has placed an order, an ordered image owner ID 2503, an order date/time 2504, an order amount 2505, a tax amount 2506, a number 2507 of ordered copies, a site ID 2508 of the print site which has received the order, and an order ID 2509 at the print site.

FIG. 26 is a view showing the arrangement of an order information table 2600 stored in the information DB 118 of the photo site 105 according to this embodiment. When the user places a print order, a new record is generated for each ordered image in the order information table.

The order information table 2600 stores an order ID 2601, an image ID 2602 of the ordered image, a number 2603 of image copies ordered, an order type 2604, and an order unit price 2605. As the order type 2604, a numerical value corresponding to a service type of a print order is stored. For example, "1" is stored for an L-size print, and "2" is stored for an A4 print.

(User Information Setting Window)

FIG. 27 is a view showing an example of a user information setting window 900B generated by the photo site 105 according to this embodiment and displayed on the user terminal when a user information change button 801 shown in FIG. 8 is clicked on. The user information setting window 900B is also displayed for new user registration in the photo site 105.

The user information setting window 900B of this embodiment has the same arrangement as that of the user information setting window 900 of the first embodiment except a use status confirm button 816. Hence, the same reference numerals as in the user information setting window 900 denote the same items in FIG. 27, and a description of each item will be omitted. The use status confirm button 816 is used to confirm the service use status and disk capacity use status. When this button is clicked on, a use status confirmation window 2900 shown in FIG. 28 is displayed.

(Service Use Status Confirmation Window)

FIG. 28 is a view showing an example of the use status confirmation window 2900 generated by the photo site 105 according to this embodiment and displayed on the user terminal when the use status confirm button 816 shown in FIG. 27 is clicked on.

In the use status confirmation window 2900, the user's print order status for the past three months is displayed as a list 2901. A current data archive upper limit size 2902 of the user and a data archive upper limit size estimate value 2903 for the next month, which are calculated from the use status, are displayed. When an OK button 2904 is clicked on, the user information setting window 900B is displayed. The method of calculating the disk use upper limit value will be described later.

(Upload Processing)

Figure 29:
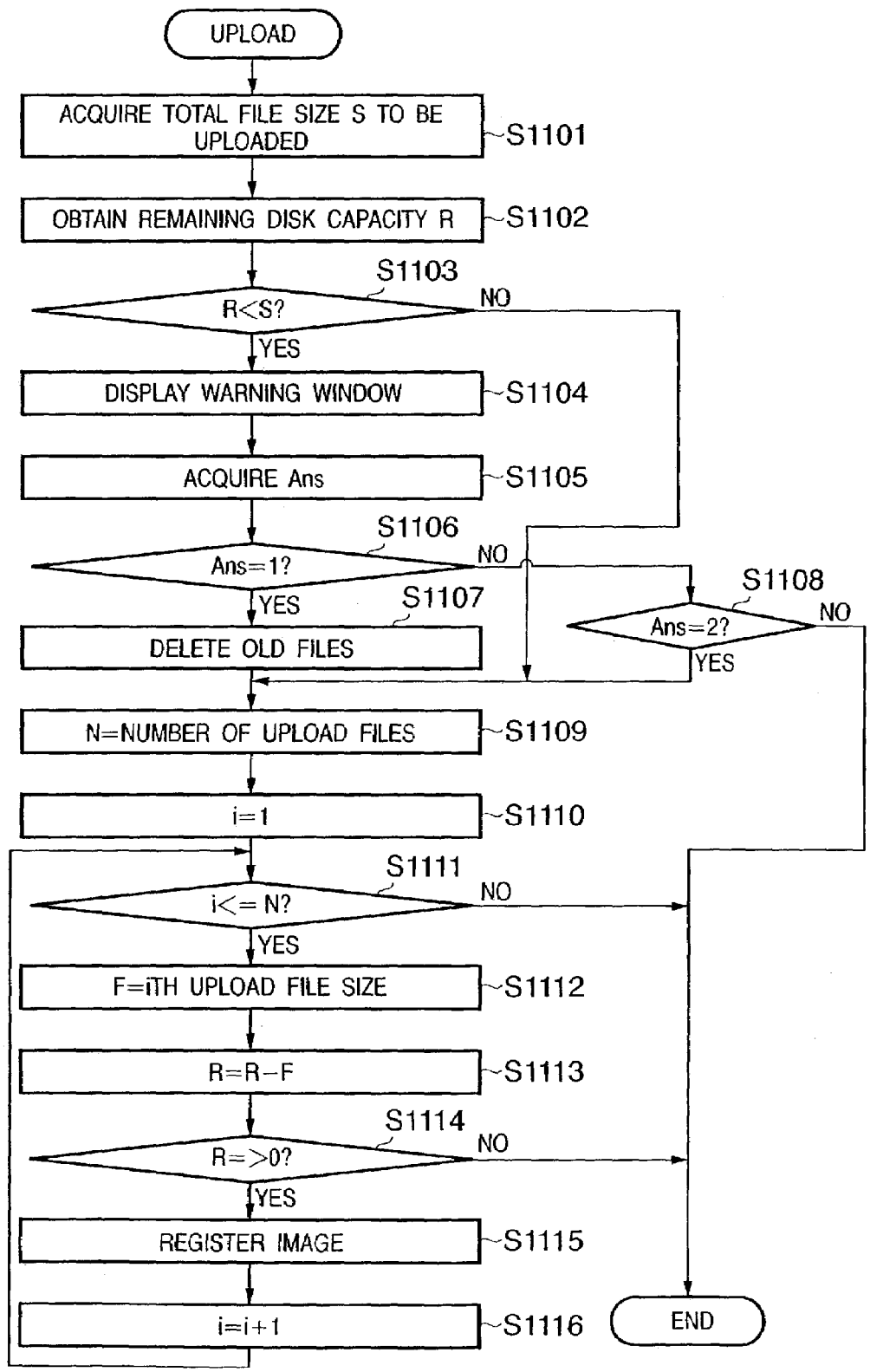
FIG. 29 is a flow chart showing the upload processing procedure in the photo site 105 according to the third embodiment of the present invention.

FIG. 29 is a flow chart showing the upload processing procedure executed in the photo site 105 according to this embodiment when a transmission button 1104 of an upload window 1100 shown in FIG. 11 is clicked on.

In step S1101, a total file size S of images that the user wants to upload is acquired from the user terminal.

In step S1102, a remaining disk capacity R that can be used by the user who is going to upload images is calculated. To obtain the remaining disk capacity R, a record having, as the user ID 401, the user ID of the user who is going to upload images is searched for from the user information table 400C, and a data archive upper limit size 415 of the record is acquired. Then, all records having, as the user ID 302, the user ID of the user who is going to upload images are searched for from the image information table 300C. The sizes of original image files are acquired and added using the original file paths of the records, thereby obtaining the total file size of the images currently uploaded by the user. When the total file size is subtracted from the archive upper limit size 415, the usable disk capacity R can be obtained.

In step S1103, it is checked whether the total upload file size S is larger than the remaining disk capacity R. If R<S, a warning window 3200 is displayed in step S1104.

Figure 30:
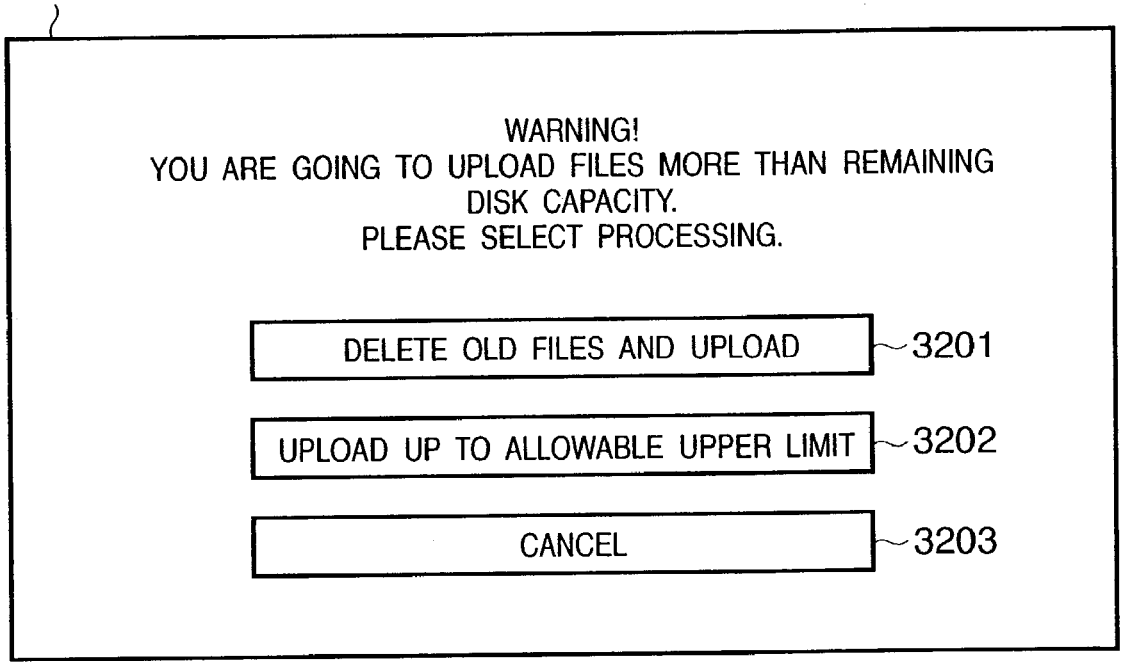
FIG. 30 is a view showing a warning window 3200 in uploading an image, which is generated by the photo site 105 according to the third embodiment of the present invention.

FIG. 30 is a view showing an example of the warning window 3200 transmitted to the user terminal when the photo site 105 according to this embodiment is requested by the user terminal to upload images more than the upper limit.

In step S1105, a return value Ans from the warning window 3200 is acquired. When a button 3201 is clicked on, Ans is 1. When a button 3202 is clicked on, Ans is 2. When a button 3203 is clicked on, Ans is 3.

In step S1106, it is determined whether Ans is 1. If YES in step S1106, old file delete processing is performed in step S1107. That is, user images are searched for and deleted in the chronological order until R becomes more than S.

In step S1108, it is determined whether Ans is 2. If YES in step S1108, the flow advances to step S1109. Otherwise, the processing is ended without executing upload processing.

In step S1109, a number N of files to be currently uploaded is acquired.

In step S1110, an operation variable i which counts the number of files is initialized to 1.

While i is equal to or smaller than N in step S1111, processing operations in steps S1112 to S1116 are sequentially executed.

In step S1112, the ith upload file size F is obtained.

In step S1113, a value obtained by subtracting F from R, i.e., the disk capacity that remains at the time of upload of the ith file is substituted into R.

In step S1114, it is determined whether R is 0 or more. If NO in step S1114, this file cannot be uploaded, and the processing is ended.

If YES in step S1114, registration processing of the ith image is performed in step S1115. More specifically, one record is generated in the image information table. The current time is set to the creation date/time 308 and registered in the information DB 118.

In step S1116, i is incremented by one, and the flow returns to step S1111.

With the above processing, the image can be uploaded. In this embodiment, processing after the transmission button 1104 in the image upload window 1100 is clicked on is executed by the photo site 105. When the usable disk capacity R on the server is transferred to the user PC 102, processing in steps S1101 to S1106 can be executed on the client PC 102.

(Image Print Order Processing)

Figure 31:
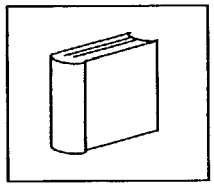
FIG. 31 is a view showing an example of a print order window 3300 generated by the photo site 105 according to the third embodiment of the present invention.

FIG. 31 shows an example of a print order window 3300 in a print site 109A according to this embodiment. When a checkbox corresponding to an image for which a print order is to be placed is marked on an album editing window 800 shown in FIG. 8, and a print order button 809 on this window is clicked on, the photo site 105 recognizes the print order and transmits to the user terminal a window (not shown) on which a print site that should print the image is to be selected. When the user selects a desired print site (print site 109A) on this window, the photo site 105 sends a print order window display request to the selected print site.

FIG. 32 shows an example of the data format of the print order window display request sent to the print site. The print site 109A generates the print order window 3300 in accordance with the information received from the photo site 105 and transmits the print order window 3300 to the user terminal.

On the print order window 3300, an order type 3301, an order size 3303 of each image, and a number 3304 of image copies ordered can be designated. When an estimate button 3305 is clicked on, the print site 109A sends information for an estimate display request shown in FIG. 33 to the photo site 105. When a cancel button 3306 is clicked on, the photo site 105 is notified that the order is canceled, and the album editing window 800 from the photo site 105 is displayed. In this embodiment, the presence/absence of a border can be selected as an order type. In addition, the type of paper (mat or gloss) or the like may be selectable.

When the print site 109A sends the estimate display request to the photo site 105, the photo site 105 transmits to the user terminal a window (not shown) on which information of the person who has placed the order and the delivery destination are to be input and set. On the basis of the returned information, the photo site transmits an estimate request to the print site. Upon acquiring an estimate result, the photo site transmits an estimate result window to the user terminal. When the user agrees with this estimate, the latest settlement processing is executed, and order information is transmitted to the print site 109A.

FIG. 34 shows information sent from the photo site 105 to the print site 109A in accordance with order processing. On the basis of this information, the print site 109A executes digital image printing and delivery processing.

(Formal Order Processing)

Figure 35:
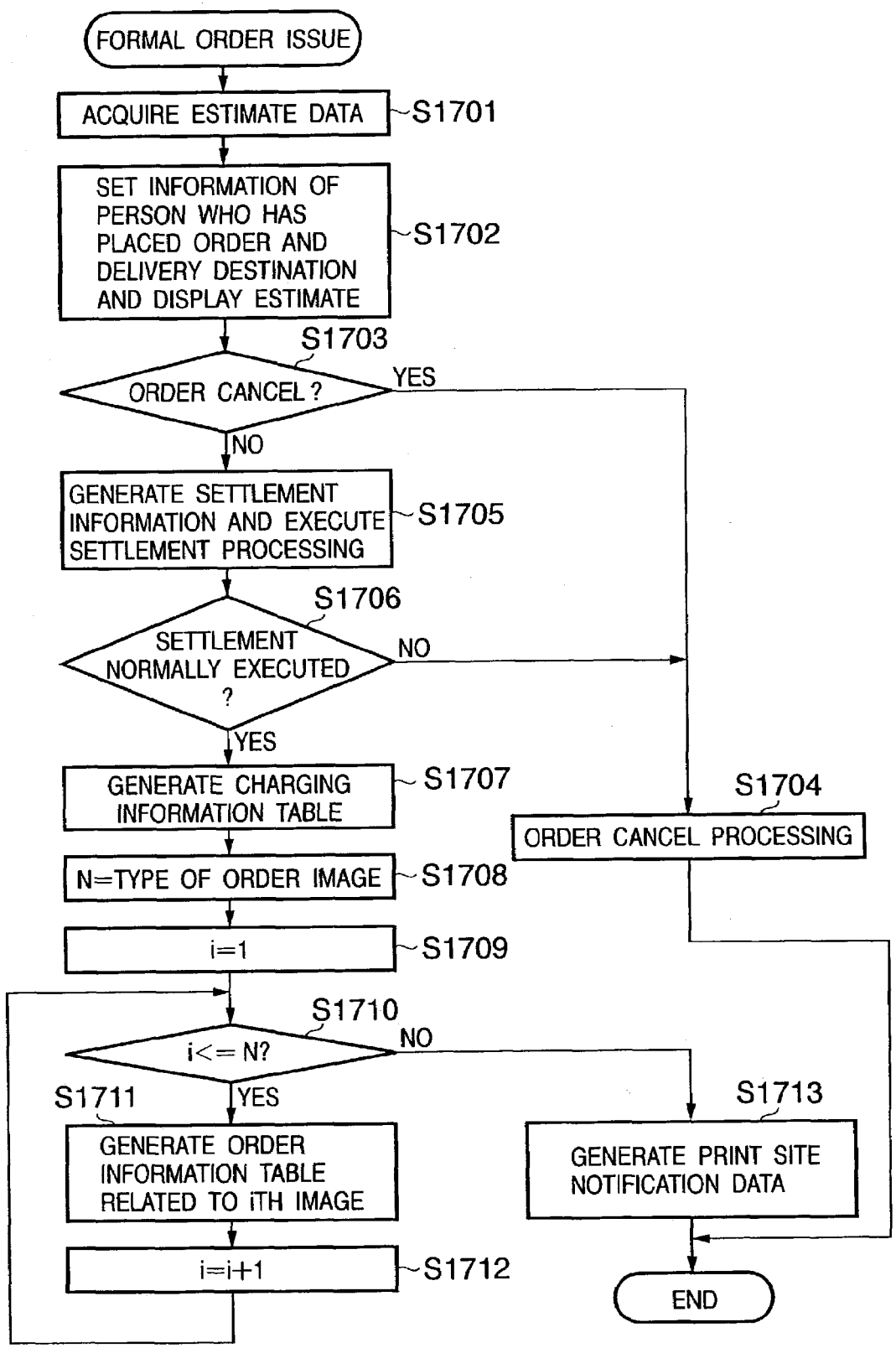
FIG. 35 is a flow chart showing a processing procedure when the photo site 105 according to the third embodiment of the present invention issues a formal print order.

FIG. 35 is a flow chart showing a processing procedure when the photo site 105 according to this embodiment receives an estimate request instruction and then issues formal order information.

In step S1701, estimate information necessary for a print order, which is requested by the print site 109A, is acquired.

In step S1702, various kinds of information necessary for a print order, including order information and delivery destination information, are input, and an estimate is displayed. A detailed description of these processing operations will be omitted.

In step S1703, it is determined whether the user has canceled the order during processing in step S1702. If YES in step S1703, order cancel processing is executed in step S1704, and the processing is ended. A detailed description of order cancel processing will be omitted.

If NO in step S1703, settlement information is generated in step S1705, and settlement processing is performed. A detailed description of settlement processing will also be omitted.

In step S1706, it is determined whether the settlement processing has normally been executed. If the user has canceled settlement, or the settlement processing has not been normally executed, order cancel processing is performed in step S1704, and the processing is ended.

If YES in step S1706, a new record is generated on the charging information table 2500 in correspondence with this print order in step S1707. The order ID 2501, which is a number capable of uniquely specifying the order in the photo site 105, is generated in the photo site 105. The user ID 2502 is the user ID of the user who has placed the print order. When a browsing user has placed a print order, "0" is stored in the user ID 2502. The user ID of the album owner is stored in the ordered image owner ID 2503. The current time acquired using the clock function 201 is set to the order date/time 2504. The order amount 2505, the tax amount 2506, the number 2507 of copies ordered, the print site ID 2508 and the print site order ID 2509 are acquired and set from the information shown in FIG. 33, which is sent from the print site 109A to the photo site 105.

In step S1708, an image type N necessary for this order is acquired from the information sent from the print site 109A to the photo site 105.

In step S1709, the operation variable i that counts the number of image types is initialized to 1.

In step S1710, it is determined whether i is N or less. Processing in steps S1711 and S1712 is repeated while i is equal to or less than N.

In step S1711, a record related to the ith image is generated on the order information table 2600. The order ID 2601 has the same value as that of the order ID 2501 contained in the record of the charging information table, which is generated in step S1707. The image ID 2602 has the same value as that of the image ID 301 set in the record related to the ordered image on the image information table 300C. The number 2603 of image copies ordered, the order type 2604 and the order unit price 2605 are acquired and set from the information shown in FIG. 33, which is sent from the print site 109A to the photo site 105.

In step S1712, i is incremented by one.

If it is determined that i>N in step S1710, order information notification data to the print site 109A is generated in step S1713, and the processing is ended.

(Data Archive Upper Limit Size Calculation Processing for Each User)

Figure 36:
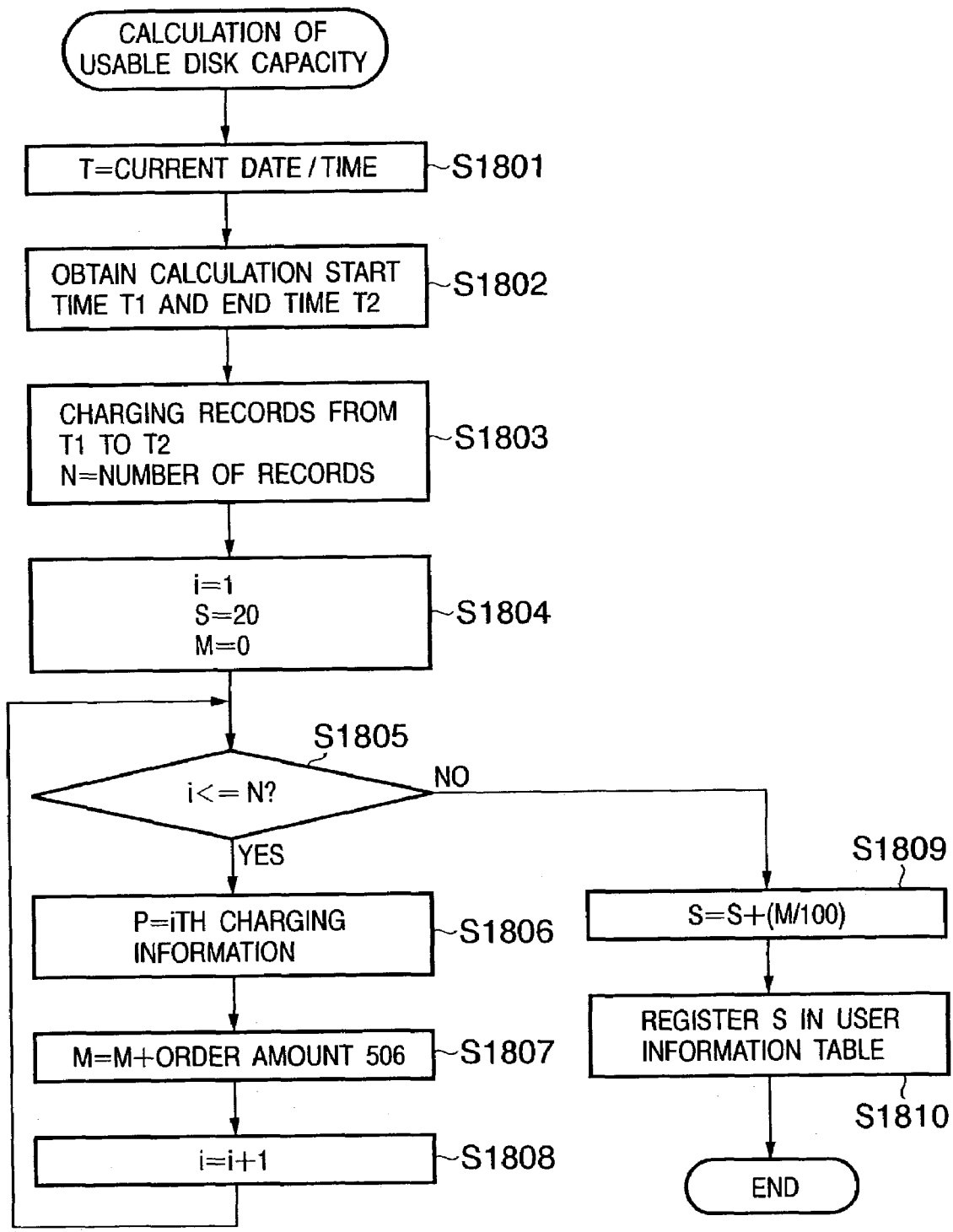
FIG. 36 is a flow chart showing a processing procedure of data archive upper limit size calculation processing for each user in the photo site 105 according to the third embodiment of the present invention.

FIG. 36 is a flow chart showing processing of calculating a data archive upper limit size for each user in the photo site 105 according to this embodiment. This processing is performed by the allowable disk use amount management module 202B, as described above.

In this embodiment, the data archive upper limit size is calculated for all users periodically (e.g., at the end of every month) by using the clock function 201 (FIG. 22) of the photo site 105. On the basis of the calculated value, the data archive upper limit size 415 of the record corresponding to each user on the user information table 400C (FIG. 24) of the information DB 118 is updated.

In step S1801, a current time T is acquired. the current time can be acquired from the clock function 201.

In step S1802, a service use record calculation start time T1 and end time T2 are obtained. In this embodiment, the data archive upper limit size of the next month is determined at the end of a month in accordance with the order amount of two months, i.e., this and last months. Assume that the use status confirmation window 2900 shown in FIG. 28 displays data as of in Jun. 30, 2002. In this case, the data archive upper limit size of July, 2002 is determined in accordance with the order amount of May and June of 2002.

Hence, the calculation start time T1 obtained in step S1802 is the first day of the month before the current time T acquired in step S1801. In the example show in FIG. 28, the start time T1 is May 1, 2002. The calculation end time T2 is Jun. 30, 2002.

In step S1803, records corresponding to orders placed from the times T1 to T2 are extracted, in the charging information table 2500, from records having the user ID of the user for which the current data archive upper limit size is to be calculated. The number of records is defined as N.

Step S1804 is a step of initializing various operation variables. More specifically, the operation variable i that counts the number of processed records is initialized to 1. An operation variable S used to obtain the data archive upper limit size of the user is initialized to 20. An operation variable M used to obtain the total order amount of the user is initialized to 0. The initial value of the operation variable S corresponds to the data archive upper limit size (basic data archive upper limit size) when the user has placed no print orders at all. In this embodiment, since S (MB) is used as the data archive upper limit size, the basic data archive upper limit size is 20 MB. The actual capacity and the value of the operation variable S need not have identical values.

In step S1805, it is determined whether i is N or less. Processing in steps S1805 to S1808 is repeated while i is equal to or less than N, thereby accumulating order amounts for the N records.

In step S1806, the value of the order amount 2505 is acquired from the ith record of the N records related to the orders from the times T1 to T2, which are found upon search in step S1803.

In step S1807, the order amount acquired in step S1806 is added to the operation variable M.

In step S1808, i is incremented by one.

If NO (i>N) in step S1805, the flow advances to step S1809 to calculate the new data archive upper limit size. In this embodiment, a value obtained by dividing the total order amount M (yen) from the times T1 to T2 by 100 and adding the resultant quotient (the number of units is rounded down) to the basic data archive upper limit size S is obtained as the new data archive upper limit size.

In the example shown in FIG. 28, the total order amount from the times T1 to T2 is ¥2,810. In the next month, 20 (MB) as a privilege (print privilege) corresponding to the service use record is added to the basic data archive upper limit size of 20 (MB), so 40 (MB) can be used.

In this embodiment, 10 MB is added every time the total order amount for two months reaches ¥1,000. The increase amount of the capacity may be calculated also in consideration of other conditions as well as the period for which the total order amount is calculated and the capacity increase rate by the order amount. The update period and time of the data archive upper limit size can also arbitrarily be set.

For example, the increase rate may be further increased when the total order amount in a predetermined period exceeds a predetermined amount. Alternatively, when the total order amount calculated at the previous update time exceeds a predetermined time, and the data archive upper limit size should decrease at the next update time, the decrease amount may be suppressed.

The order amount may be weighted in accordance with the contents (e.g., the print size) of an order and accumulated.

In step S1810 the new data archive upper limit size is registered in the disk upper limit size 415 of the user information table 400C.

With the above processing, the disk capacity that can be used by the user can automatically be controlled in accordance with the user's print order amount within the predetermined period.

The processing shown in FIG. 36 has step S1810 of updating the user information table in accordance with the finally determined data archive upper limit size. However, when data archive upper limit size calculation except periodical update processing by the system is necessary, and for example, when the use status confirmation window 2900 is displayed in accordance with a user request, the newly calculated data archive upper limit size is used only for window display, and the user information table is not updated. In this case, T2 is set to the date when the use status confirmation window 2900 is displayed.

The data archive upper limit size 2902 usable in that month, which is displayed on the use status confirmation window 2900, can also be calculated by the processing shown in FIG. 36 by setting the calculation start time T1 to the first day of the month before last (in the example shown in FIG. 28, Apr. 1, 2002) and the calculation end time T2 to the last day of the last month (in the example shown in FIG. 28, May 31, 2002) in step S1802.

In the processing shown in FIG. 36, when the newly calculated data archive upper limit size is smaller than the current data archive upper limit size, and accordingly, the total file size of images that are currently uploaded by the user exceeds the data archive upper limit size, an e-mail message may be sent to the user to notify him/her of it.

A notification by e-mail can be sent not only when the total file size of images uploaded by the user exceeds the data archive upper limit size but also when the user information is changed (including a change advantageous for the user, e.g., an increase in data archive upper limit size) or in accordance with other arbitrary settings.

In this embodiment, the data archive upper limit size is calculated in accordance with the print order amount of the user. However, the data archive upper limit size may be calculated in accordance with the number of image copies ordered.

In this case, the value acquired in step S1807 is not the order amount 2505 but the number 2507 of copies ordered.

In this embodiment, the storage capacity is used as the data archive upper limit size. Instead, the number of images that can be uploaded may be defined as the data archive upper limit size.

In this embodiment, the data archive upper limit size (allowable disk use amount) is used as a restriction related to service providing, which is changed on the basis of the service use record. However, any other restriction may be used. That is, the object of the present invention is to give a privilege (to relax or exclude the restriction) to a user preferable for the operator of the information providing server in accordance with the service use record. The restriction to be actually used, the condition for the privilege, and the kind of privilege can be arbitrarily set.

In the above embodiments, only a photo site server comprising a single device has been described. However, the same function as that of the server apparatus of the present invention may be implemented by a system constituted by a plurality of devices.

The present invention also incorporates a case wherein a software program which implements the functions of the above-described embodiments is supplied to the system or apparatus having a computer capable of executing the program directly from a recording medium or using wired/radio communication, and the computer of the system or apparatus is caused to execute the supplied program.

Hence, to implement the functional processing of the present invention by a computer, the program code itself, which is supplied to and installed in the computer, also implements the present invention. That is, a computer program itself, which implements the functional processing of the present invention, is also incorporated in the present invention.

In this case, the program can take any form such as an object code, a program to be executed by an interpreter, or script data to be supplied to the OS as long as the functions of the program can be obtained.

As a recording medium for supplying the program, for example, a magnetic recording medium such as a floppy disk, hard disk, and magnetic tape, an optic/magnetooptical storage medium such as an MO, CD-ROM, CD-R, CD-RW, DVD-ROM, DVD-R, or DVD-RW, a nonvolatile semiconductor memory, or the like can be used.

As a program supply method using wired/radio communication, a data file (program data file) that can be a computer program that constitutes the present invention on a client computer, and for example, the computer program itself, which constitutes the present invention, or a compressed file containing an automatic install function may be stored in a server on a computer network, and the program data file may be downloaded to a client computer connected to the server. In this case, the program data file may be divided into a plurality of segment files, and the segment files may be stored in different servers.

That is, a server apparatus which causes a plurality of users to download a program data file that causes a computer to implement the functional processing of the present invention is also incorporated in the present invention.

The program of the present invention may be encrypted, stored in a storage medium such as a CD-ROM, and distributed to users. Any user who satisfies predetermined conditions may be allowed to download key information for decryption from a homepage through, e.g., the Internet, execute the encrypted program using the key information, and install the program in the computer.

The functions of the above-described embodiments are implemented not only when the readout program is executed by the computer but also when the OS or the like, which is running on the computer, performs part or all of actual processing on the basis of the instructions of the program.

The functions of the above-described embodiments are also implemented when the program read out from the storage medium is written in the memory of a function expansion board inserted into the computer or a function expansion unit connected to the computer, and the CPU of the function expansion board or function expansion unit performs part or all of actual processing on the basis of the instructions of the program.

As described above, according to the third embodiment of the present invention, service use by a user can be promoted without any load on the operator by automatically controlling a privilege to be given to the user in accordance with the user's service use status.

Furthermore, the present invention can be applied to the system comprising either a plurality of units or a single unit. It is needless to say that the present invention can be applied to the case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the appended claims.

What is claimed is:

1. A server apparatus that receives image data from a user terminal via a network and stores the received image data into an image-storage unit, comprising:
    an order accepting unit constructed to accept a print order of the stored image data from the user terminal;
    an editing accepting unit constructed to accept an edit instruction of the stored image data from the user terminal;
    a browsing accepting unit constructed to accept a browse request of the stored image data from the user terminal;
    a recording unit constructed to record a time when the print order is accepted, a time when the edit instruction is accepted, and a time when the browse request is accepted;
    a deleting unit constructed to delete the stored image data from said image-storage unit, when a starting point time, which is determined by a type of starting point time and the times recorded by said recording unit, is before a time obtained by subtracting a predetermined archive period from the current time; and
    a changing unit constructed to change, based on registered user information, the type of starting point time.

2. An apparatus according to claim 1, further comprising:
    a product information receiving unit constructed to receive purchased product information from the user terminal; and
    a determining unit constructed to determine an archive period based on the received purchased product information,
    wherein said deleting unit deletes the stored image data from said image-storage unit, when the starting point time is before a time obtained by subtracting the determined archive period from the current time.

3. An apparatus according to claim 1, further comprising:
    a delete notifying unit constructed to notify the user terminal that the stored image data is to be deleted before the stored image data is deleted by said deleting unit.

4. A server apparatus according to claim 1, further comprising:
    a managing unit constructed to manage a user ID of the user terminal and an amount of print orders from the user terminal by storing in a storage unit the user TD and the amount of print orders associated with each other;
    an accumulating unit constructed to accumulate an amount of print orders for each of the user IDs stored in the storage unit;
    a calculating unit constructed to calculate, based on the accumulating result, an archive upper limit for each of the user IDs;
    an acquiring unit constructed to acquire, from the user terminal, a total size of image files to be uploaded from the user terminal;
    a comparing unit constructed to compare the acquired total size with the archive upper limit calculated for the user ID of the user terminal; and
    a storing unit constructed to accept the image files from the user terminal if the acquired total size is less than the archive upper limit calculated for the user ID of the user terminal and stores the uploaded image file into the image-storage unit.

5. A method for receiving image data from a user terminal via a network and storing the received image data into an image-storage unit, the method comprising:
    an order accepting step of accepting a print order of the stored image data from the user terminal;
    an editing accepting step of accepting an edit instruction of the stored image data from the user terminal;
    a browsing accepting step of accepting a browse request of the stored image data from the user terminal;
    a recording step of recording a time when the print order is accepted, a time when the edit instruction is accepted, and a time when the browse request is accepted;
    a deleting step of deleting the stored image data from said image-storage unit, when a starting point time, which is determined by a type of starting point time and the times recorded in said recording step, is before a time obtained by subtracting a predetermined archive period from the current time; and
    a changing step of changing, based on registered user information, the type of starting point time.

6. A computer readable storage medium storing a computer-executable program, said computer-executable program being executable by a computer so as to control the computer to receive image data from a user terminal via a network and store the received image data into an image-storage unit, the computer-executable program comprising code for causing the computer to execute:
    an order accepting step of accepting a print order of the stored image data from the user terminal;
    an editing accepting step of accepting an edit instruction of the stored image data from the user terminal;
    a browsing accepting step of accepting a browse request of the stored image data from the user terminal;
    a recording step of recording a time when the print order is accepted, a time when the edit instruction is accepted, and a time when the browse request is accepted;
    a deleting step of deleting the stored image data from said image-storage unit, when a starting point time, which is determined by a type of starting point time and the times recorded in said recording step, is before a time obtained by subtracting a predetermined archive period from the current time; and a changing step of changing, based on registered user information, the type of starting point time.

* * * * *